US010764907B2

United States Patent
Ravindran et al.

(10) Patent No.: US 10,764,907 B2
(45) Date of Patent: Sep. 1, 2020

(54) SCHEDULING OF DATA TRANSMISSION FROM INTERNET OF THINGS USER EQUIPMENT TO A BASE STATION OF A CELLULAR NETWORK

(71) Applicant: Futurewei Technologies, Inc., Plano, TX (US)

(72) Inventors: Ravishankar Ravindran, San Ramon, CA (US); Shweta Sagari, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/859,089

(22) Filed: Dec. 29, 2017

(65) Prior Publication Data

US 2019/0208528 A1    Jul. 4, 2019

(51) Int. Cl.
| | |
|---|---|
| H04W 72/12 | (2009.01) |
| H04W 56/00 | (2009.01) |
| H04W 72/04 | (2009.01) |
| H04W 72/00 | (2009.01) |
| H04J 1/06 | (2006.01) |
| H04L 5/00 | (2006.01) |
| H04L 29/08 | (2006.01) |

(52) U.S. Cl.
CPC ............ *H04W 72/121* (2013.01); *H04J 1/06* (2013.01); *H04W 56/001* (2013.01); *H04W 72/005* (2013.01); *H04W 72/048* (2013.01); *H04L 5/0016* (2013.01); *H04L 67/12* (2013.01)

(58) Field of Classification Search
CPC ............ H04W 72/121; H04W 56/001; H04W 72/005; H04W 72/048; H04J 1/06; H04L 5/0016; H04L 67/12
See application file for complete search history.

(56) References Cited

U.S. PATENT DOCUMENTS

| | | | |
|---|---|---|---|
| 6,393,047 B1 * | 5/2002 | Popovic' | ............... H04B 1/707 370/342 |
| 7,480,269 B2 * | 1/2009 | Heo | ...................... H04L 1/0029 370/311 |

(Continued)

FOREIGN PATENT DOCUMENTS

| | | | | |
|---|---|---|---|---|
| CN | 107071922 A | * | 8/2017 | |
| EP | 1035676 A1 | * | 9/2000 | ......... H04J 13/0044 |
| JP | 2004140614 A | * | 5/2004 | |

*Primary Examiner* — Michael Thier
*Assistant Examiner* — Nevena Zecevic Sandhu
(74) *Attorney, Agent, or Firm* — Vierra Magen Marcus, LLP

(57) ABSTRACT

Data transmissions are scheduled from internet of things (IoT) user equipment (UEs) to a base station (BS) that serves those IoT UEs in a cellular network. A BS may broadcast synchronization information to the IoT UEs that allows the BS to calculate and use a schedule for receiving data transmissions from the UEs. This information can include a total number of the IoT UEs being serviced, a length of a spreading code to use in the schedule, a time domain periodicity of available resources, and a maximum number of the IoT UEs that can send data to the BS at one time. Each IoT UE can independently apply a mathematical operation to the broadcast information it receives to calculate and use the schedule. The BS can receive the data transmissions from each of the IoT UEs according to that schedule.

21 Claims, 9 Drawing Sheets

(56) References Cited

U.S. PATENT DOCUMENTS

| | | | |
|---|---|---|---|
| 7,986,959 B2* | 7/2011 | Malladi | H04W 52/08 455/522 |
| 2002/0093953 A1* | 7/2002 | Naim | H04W 72/0453 370/386 |
| 2005/0157686 A1* | 7/2005 | Yang | H04J 13/10 370/335 |
| 2008/0232319 A1* | 9/2008 | Son | H04L 5/0007 370/329 |
| 2014/0098782 A1* | 4/2014 | Shirazi | H04J 13/0003 370/330 |
| 2016/0007304 A1* | 1/2016 | Morita | H04W 52/367 370/311 |
| 2018/0205486 A1* | 7/2018 | Lin | H04W 84/12 |
| 2018/0295583 A1* | 10/2018 | Cornwall | H04W 52/0258 |
| 2018/0316558 A1* | 11/2018 | Levesque | H04W 76/10 |

* cited by examiner

SCHEDULING OF DATA TRANSMISSION FROM INTERNET OF THINGS USER EQUIPMENT TO A BASE STATION OF A CELLULAR NETWORK

FIELD

The disclosed technology relates to optimizing cellular networks and in particular, to optimizing communication between a cellular network base station and numerous internet of things (IoT) user equipment (UE) that the base station serves.

BACKGROUND

A cellular network, or mobile network, is a wireless communication network that may be divided into one or more geographical regions known as cells, that may be communicatively interconnected via one or more fixed location transceivers known as base stations. Through an arrangement of cells and base stations (BSs) of a cell, a cellular network may provide wireless communication coverage over a large geographical area and enable wireless communication devices, such as long term evolution (LTE) user equipment (UE) to communicate with each other anywhere in the cellular network, potentially over long distances.

Modern cells are increasing in the number of devices or LTE UEs that communicate with a single BS of a cell. Notably, the proliferation of one type of UEs, internet of things (IoT) UEs, is expected to grow to millions of such devices in a square kilometer in the next few years. As compared to existing cellular UEs, such as third generation (3G) and fourth generation (4G) UEs, the IoT UEs use smaller transmission timeslots because they send small amounts of data, usually infrequently. However, since there may be thousands of IoT UEs that a BS serves, the time and messaging overhead to set up (e.g., handshake) for the transmission of these small data messages can cripple the communication ability of the BS. For example, an increase in the number of IoT UEs of a cell can result in an exponential increase in the number of messages and time required to send separate data transmission between those devices and the BS.

BRIEF SUMMARY

According to one aspect of the present disclosure, there is provided a method that includes scheduling data transmissions in a network, comprising: broadcasting synchronization information to a plurality of user equipment in the network, wherein the synchronization information includes a total number of the plurality of user equipment, a length of a spreading code, a time domain periodicity of available resources, and a maximum number of the plurality of user equipment that data transmissions can be simultaneously received from; and receiving the data transmission from each of the plurality of user equipment according to a schedule, wherein the schedule is calculated independently at a base station serving the plurality of user equipment by applying a mathematical operation to the synchronization information.

According to one aspect of the present disclosure, there is provided a cellular network base station for scheduling data transmissions in a network, comprising: a memory storage comprising instructions; and one or more processors in communication with the memory storage, wherein the one or more processors execute the instructions to: broadcast synchronization information to a plurality of user equipment in the network, wherein the synchronization information includes a total number of the plurality of user equipment, a length of a spreading code, a time domain periodicity of available resources, and a maximum number of the plurality of user equipment that data transmissions can be simultaneously received from; and receive the data transmission from each of the plurality of user equipment according to a schedule, wherein the schedule is calculated independently at a base station serving the plurality of user equipment by applying a mathematical operation to the synchronization information.

According to one aspect of the present disclosure, there is provided a non-transitory computer-readable medium storing computer instructions for scheduling data transmissions in a network, that when the computer instructions are executed by one or more processors, cause the one or more processors to perform the steps of: broadcasting synchronization information to a plurality of user equipment in the network, wherein the synchronization information includes a total number of the plurality of user equipment, a length of a spreading code, a time domain periodicity of available resources, and a maximum number of the plurality of user equipment that data transmissions can be simultaneously received from; and receiving the data transmission from each of the plurality of user equipment according to a schedule, wherein the schedule is calculated independently at a base station serving the plurality of user equipment by applying a mathematical operation to the synchronization information.

Optionally, in any of the preceding aspects, another implementation of the aspect provides wherein the schedule includes an assignment of spreading codes for each of the plurality of user equipment to spread data for each of the data transmissions and an assignment of time slot numbers for each of the plurality of user equipment to use to send the data transmissions to the base station.

Optionally, in any of the preceding aspects, another implementation of the aspect further includes, prior to broadcasting synchronization information: receiving an initialization signal from each of the plurality of user equipment; sending communication protocol information to each of the plurality of user equipment in response to receiving the initialization signals, wherein the communication protocol information includes frame timing information, frequency offsets and a unique user equipment identification for each of the plurality of user equipment; and receiving the data transmissions from each of the plurality of user equipment using a protocol that is based on the communication protocol information sent to each of the plurality of user equipment.

Optionally, in any of the preceding aspects, another implementation of the aspect further includes, prior to receiving each of the data transmissions from each of the plurality of user equipment: receiving power reference signals from each of the plurality of user equipment; sending power level information to each of the plurality of user equipment in response to receiving the power reference signals; and receiving the data transmissions from each of the plurality of user equipment at a power level that is based on the power level information sent to each of the plurality of user equipment.

Optionally, in any of the preceding aspects, another implementation of the aspect further includes, obtaining user equipment information and network information available to a base station, wherein user equipment information and network information includes an uplink traffic demand from each of the plurality of user equipment, a total number of the plurality of user equipment, and an uplink traffic profile of each of the plurality of user equipment; and determining the synchronization information based on the obtained user equipment information and network information.

Optionally, in any of the preceding aspects, another implementation of the aspect further includes, calculating the schedule at each of the plurality of user equipment by applying the mathematical operation to the synchronization information; and wherein: the plurality of user equipment are internet of thing (IoT) devices, and the schedule calculated at each of the plurality of user equipment is based on a spreading code to spread data for each of the received data transmissions and a time slot number in which to transmit each of the received data transmissions.

Optionally, in any of the preceding aspects, another implementation of the aspect provides wherein: the synchronization information further includes a multiplexing frequency used by the plurality of user equipment to schedule sending the data transmissions to the base station; and the schedule is further based on an assignment of the multiplexing frequency for each of the plurality of user equipment to use to send the data transmissions to the base station.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

Figure 1:
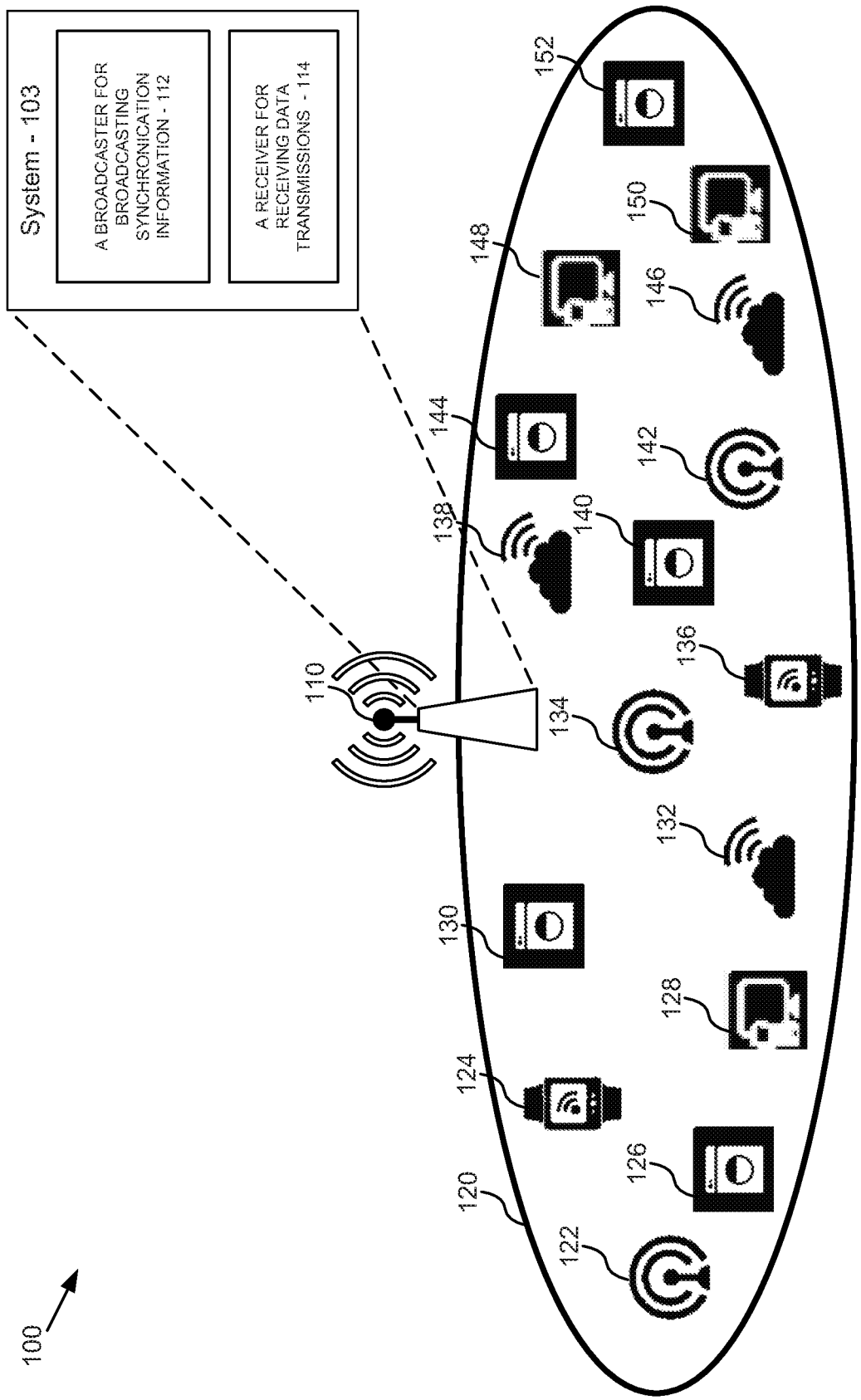
FIG. 1 illustrates a network environment that can be used to implement various embodiments.

The disclosed technology relates to efficient scheduling of data transmissions from internet of things (IoT) user equipment (UEs) to a base station (BS) that serves those UEs in a "cell" of a cellular network. For example, a cell BS may broadcast certain synchronization information to IoT UEs being serviced by that BS so that they can calculate and use a schedule for sending data transmissions to the BS. The synchronization information can include a total number of the IoT UEs being serviced by the BS, a length of a spreading code to use in the schedule, a time domain periodicity of available resources for receiving data transmissions at the BS, and a maximum number of the IoT UEs that are permitted to send data to the BS at one time. Each IoT UE can independently apply a mathematical operation to the broadcast information it receives to calculate the schedule. The BS can then receive data transmissions sent by each of the IoT UEs according to that schedule.

According to embodiments, the schedule may be based or use spread-spectrum access technology, such as by including spreading codes that specifically correspond to a spread-spectrum technology. Being based on a spread-spectrum access technology may be different than a long term evolution (LTE) UE base station spread-spectrum access technology. For example, to enable simultaneous multiple data transmissions from the IoT UEs to the BS, and avoid packet error during the multiple data transmissions, data at each IoT UE is spread by unique spreading code. In some embodiments, the schedule calculated by each IoT UE includes spreading codes $C_i$ for each IoT UE to use for spreading data in each of the data transmissions from that IoT UE. A spreading code as used herein may be a software code which spreads data for each of the data transmissions.

For instance, spreading codes may be noise-like code sequences that are generated using mathematical functions which spread narrowband IoT data over wider band of frequencies. In one non-limiting example, if an original bandwidth required to send certain amount of data for a narrowband IoT data is 15.625 kilohertz (kHz), with a 64 bit-length spreading code, 1 megahertz (MHz) of bandwidth is required to send same amount of data. In some embodiments, a length of spreading code to be used by the IoT UEs to calculate the schedule is broadcasted from the BS to all of those UEs. Based on that length, a base station serving those UEs uses a same mathematical operation or function to calculate all spreading codes of length $L_c$. For some embodiments, based on that length, each of those UEs uses a same mathematical operation or function to calculate all spreading codes of length $L_c$. In some cases, if a spread code has length $L_c$, then $L_c$ spreading codes are available.

The schedule also includes time slot numbers $T_i$ during which each IoT UE is allowed transmit the data transmissions, having the data spread according to the spread code, to the BS. In one instance, the index of spreading code (out of $L_c$ spreading codes) and time slot number $T_i$ during which each IoT UE is allowed to transmit the data transmissions to the BS is calculated separately using the broadcasted information from BS to determine the schedule. Thus, a communications IoT uplink protocol that broadcasts the scheduling information and receives the data transmissions according to the schedule, allows hundreds or thousands of the IoT UEs to send numerous small and infrequent data transmissions to their BS without the usual time and messages required to handshake with the BS before sending each message. By reducing the amount of time and messages required between the IoT UE and the BS for each data transmission, the IoT uplink protocol avoids crippling the BS when it serves large numbers of IoT UEs. The IoT uplink protocol may be implemented in a dedicated IoT cell BS or by adding its functionality to an existing cell BS. In addition, the IoT uplink protocol may also be implemented in each IoT UE.

It can be appreciated that the IoT UEs may not be a subset of LTE UEs that a BS is serving. The IoT UEs and LTE UEs may use different base station spread-spectrum access technology. Thus, embodiments herein may include additional functionality in a separate BS or added to an existing BS to support this protocol for IoT UEs. It is considered that code division multiple access (CDMA) second (2G) and third generation (3G) cellular access technology uses spread-spectrum technology and thus support for spread-spectrum technology is already available in cellular systems. In one instance, the protocol herein (e.g., the IoT UEs herein) use parts of the legacy functionalities from CDMA to uplink data to the BS.

According to one embodiment, to establish the IoT uplink protocol, a cell BS can obtain information from the LTE UEs and the cell it serves to determine uplink traffic demand from each LTE UE; a total number and location of the LTE UEs; a total number of IoT UEs; and a traffic profile of the IoT UEs. Based on this information, the BS can determine and broadcast the synchronization information to all the IoT UEs. Each IoT UE can then independently apply a mathematical operation to the broadcast synchronization information it receives to calculate the schedule for sending data to the BS. Using the schedule, each IoT UE spreads the data it is to transmit using its spread codes $C_x$ and transmits data transmissions during its time slots $T_x$ which are associated with that IoT UE's unique identification number $ID_x$. The schedule calculated may have a unique spreading code and time slot number combination for each IoT UE. The BS may also independently apply the mathematical operation to the broadcast information it transmits to calculate the schedule so it knows which IoT UEs the received data transmissions are from.

It is considered that the IoT UEs may communicate data with BS using any of various wireless communication technologies, any of which may be described as a "service class." One major service class of IoT UE applications is massive machine type communications (mMTC), which includes third generation (3G) and fourth generation (4G) type cellular networks. However, there are certain limitations of current 3G and 4G networks with respect to supporting IoT UE applications. For example, 3G and 4G cellular network protocols are optimized to support UEs having high bandwidth applications (e.g. video streaming and phone calls), but not to support a high density of IoT UEs having communication traffic which is sporadic and uses short-messages. As a result the IoT UE traffic causes high controlling signal overhead for the 3G and 4G cellular network protocols because each IoT data transmission follows an attachment/bearer establishment procedure or handshake for each IoT UE that is in IDLE mode. For example an IoT UE may enter IDLE mode, when, either there is no uplink or downlink data message traffic for a pre-determined period, such as for 10 seconds, or when the UE device itself goes to a sleep mode to conserve battery power, such as after 5 to 30 minutes. In some cases, when each IoT UE exits IDLE mode to transmit uplink or receive downlink data message traffic, it will then incur the high controlling signal overhead of the attachment/bearer establishment handshake with the BS. This may occur for each uplink and downlink data message. In other words, the 3G and 4G networks are not scaled for high density IoT UE deployment. Thus, such deployment in a cell can lead to a bottleneck at the allocation of network resources at the BS or access layer that is used to receive the IoT UE uplink data, such as Long term evolution (LTE) random access channel procedure (RACH) contention-based procedures for using the 3G and 4G cellular network protocols. Thus, when IoT UEs proliferate a cell the result can be a crippling increase in data collisions, latency and retransmission for data transmissions between the UEs and the BS.

These bottlenecks may be solved by an mMTC (e.g., 3G and 4G) IoT uplink protocol as described herein, which is capable of supporting high density and low cost IoT UEs, with deep coverage, and no-strict latency requirements. This IoT uplink protocol may be more efficiently support IoT UE intended applications. In some cases, using this IoT uplink protocol, BSs of a cellular network may support up to 1,000,000 IoT UEs per square kilometer; and support them in a way that is 100 times more energy efficient than current cellular network protocols.

In addition, the IoT uplink protocol described herein may allow IoT UEs to operate more efficiently with a BS when uplinking data transmissions that: have a small packet size, such as a size of hundreds of bytes; have a sporadic traffic profile, such as inter-message intervals of 15 minutes to two hours; have data transmission traffic types that are periodic updates, such as when 80 to 95 percent of the traffic of the IoT UE is periodic; and have emergency notifications, such as when 20 to 5 percent of the traffic of the IoT UE has emergency notifications.

It is understood that the present embodiments of the invention may be implemented in many different forms and that claim scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

FIG. 1 illustrates a network environment 100 that can be used to implement various embodiments. Network environment 100 is shown having base station (BS) 110, network 120, system 103 and Internet of things (IoT) user equipment (UEs) 122-152. Network 120 may be a local network of cellular devices (e.g., a cell) having LTE UEs that include IoT UEs 122-152. BS 110 serves network 120 and thus serves IoT UEs 122-152. System 103 is shown as part of BS 110. Network environment 100 can provide content through network 120 as requested by BS 110, system 103, IoT UEs 122-152, LTE UEs of network 120, and other users of the network.

BS 110 also connects system 103 to LTE UEs of network 120 including to IoT UEs 122-152. The other (non IoT) LTE UEs of network 120 are not shown. BS 110 may be a cellular base station connecting LTE UEs of network 120 to one or more other cellular base stations. In one instance, BS 110 may be base transceiver station (BTS) piece of equipment that facilitates wireless communication between the UEs and any of various wireless communication technologies like LTE, global system for mobile communications (GSM), CDMA, wireless local loop (WLL), Wi-Fi wireless local area network, worldwide interoperability for microwave access (WiMAX) or other wide area network (WAN) technology.

For some embodiments, BS 110 may be a referred to as a radio base station (RBS), a "master node", a telecommunications node, or for the LTE standard an "eNB" node. BS 110 may include other components not shown, such as radio frequency (RF) transmitters and receivers; network controllers; network managers; routers and the like.

BS 110 may be able to schedule data transmission in network 120 as described herein. For example, in some embodiments, BS 110 includes system 103 for scheduling data transmissions between IoT UEs 122-152 and the base station. At 112, system 103 may include a broadcaster for broadcasting synchronization information to IoT UEs 122-152. The synchronization information may include a total number of the IoT UEs, a length of a spreading code, a time domain periodicity of available resources, a total number of the IoT UEs, and a maximum number of the IoT UEs that can simultaneously send data to the BS. At 114, the system 103 may include a receiver for receiving data transmissions from each of IoT UEs 122-152. For some embodiments, the schedule is calculated independently at a BS serving all of IoT UEs 122-152 by applying a mathematical operation to the synchronization information broadcast to the IoT UEs (e.g., see FIGS. 5B and 6-7). In some instances, the schedule is calculated independently at each of IoT UEs 122-152 by applying a mathematical operation to the received synchronization information (e.g., see FIGS. 5A and 6-7).

In some cases, system 103 may be part of an operating system, a base station software application, a client/server application or another component of BS 110. In some cases, system 103 may be or have a memory storage comprising instructions to be executed by one or more processors in communication with the memory storage, for scheduling data transmissions in a network, as described herein. In some cases, system 103 may be or have a non-transitory computer-readable medium storing computer instructions for scheduling data transmissions in a network, as described herein.

The functional components of system 103 (e.g., broadcaster 112 and receiver 114) may be referred to as processors, modules or components, and may each be executed on a single processor or separate processors. In some embodiments, they could be implemented with any combination of hardware and/or software. They may further include one or more elements for performing any one or combination of processes described in the embodiments.

Network 120 may be a cell of a cellular network such as a 3G or 4G cell. LTE UEs of network 120 may be for example and without limitation, a mobile wireless communication device, wireless transmit/receive unit (WTRU), mobile station, fixed or mobile subscriber unit, pager, cellular telephone, personal digital assistant (PDA), smartphone, smartwatch, desktop or laptop computer equipped with a mobile broadband adapter, consumer electronics device, or IoT UEs 122-152. Network 120 may include other components not shown, such as network controllers, managers, routers and the like.

IoT UEs 122-152 are show having 16 IoT UEs which are IoT UEs 122, 124, 126, 128, 130, 132, 134, 136, 138, 140, 142, 144, 146, 148, 150 and 152. It is considered that there may be more or fewer than 16 IoT UEs 122-152 in network 120. IoT UEs 122-152 may be for example and without limitation, household or commercial appliances, security systems, sensors, wireless Internet connectivity devices, vending machines, and wearables. In some cases, they may also be industrial handhelds, asset trackers, health monitors, parking meters, utility meters, lighting controllers, and the like.

Data may be communicated between IoT UEs 122-152 and BS 110 using data transmissions, in order for these UEs to provide their intended applications, such as logging, metering, monitoring, and measuring data. The communication between these UEs and the BS may include downlink communication from the BS to the UEs, such as to downlink data to a UE that the BS received from another base station of a cellular network (not shown). The communication also include uplink communication from the UEs to the BS, such as to uplink data to the BS that the BS will transmit to another BS.

As discussed above, due to the overhead requirements, an increase in the number of IoT UEs of a cell can result in a large multiple increase in the number of messages and time required to send separate data transmission between those devices and the BS which serves them. This will create in data collisions, latency and retransmission issues for a base station that is serving hundreds or thousands of IoT UEs.

Figure 2:
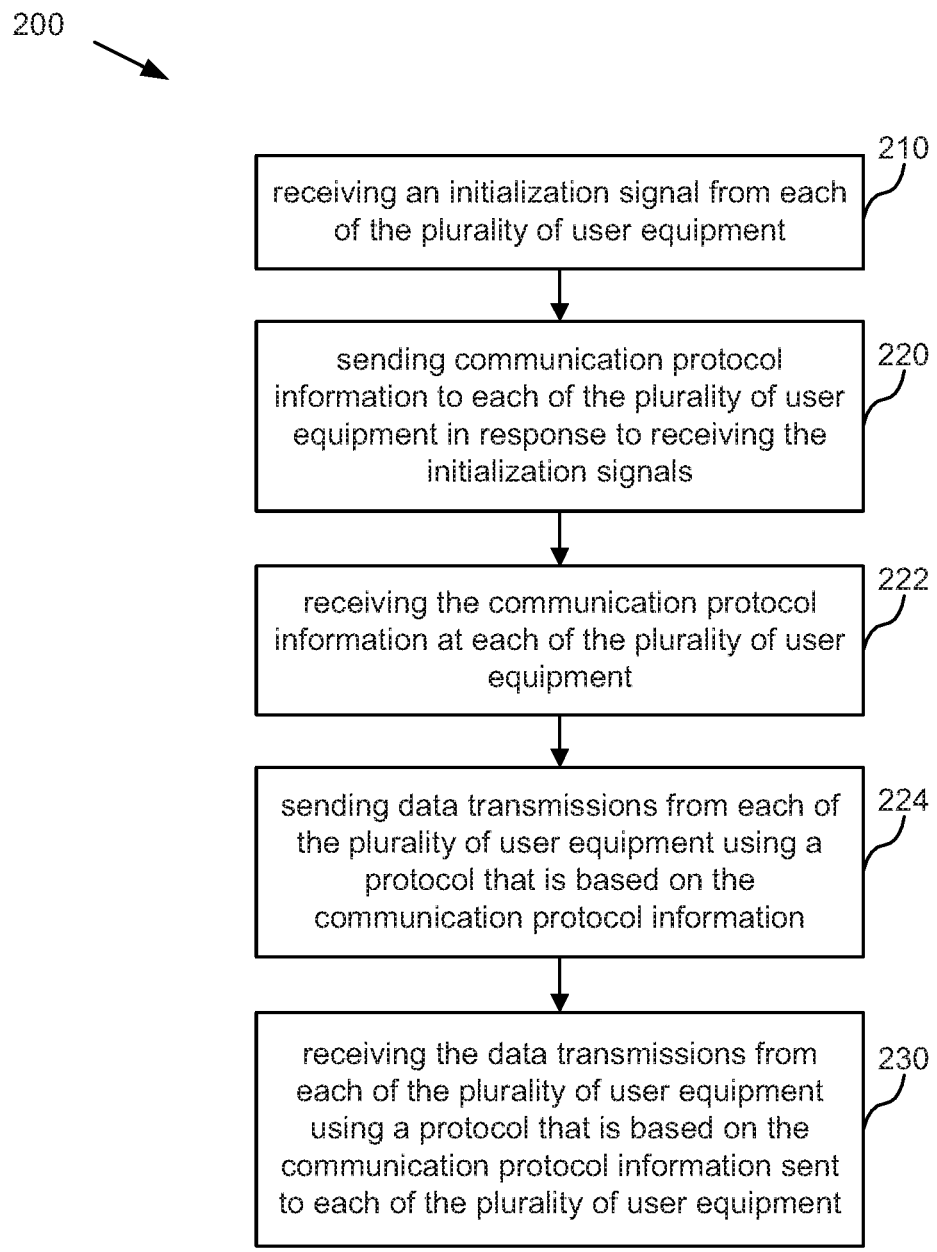
FIG. 2 is a flow diagram of a process for receiving data transmissions from user equipment (UE) based on communication protocol information sent to the UEs, according to example embodiments.

According to embodiments, the IoT uplink protocol described herein may include each IoT UE performing an initial cell search and initial acquisition procedure. For example, FIG. 2 is a flow diagram of a process 200 for receiving data transmissions from user equipment (UE) based on communication protocol information sent to the UEs, according to example embodiments. Process 200 may be performed at or by BS 110 or system 103. In one instance, process 200 is also performed by IoT UEs 122-152. However, it can be appreciated that any component illustrated in FIGS. 1 and 8 may be employed to implement the process.

Process 200 begins at 210 where an initialization signal is received by a BS from each of the LTE UEs it serves. Initialization at 210 may be performed when a new an LTE UE enters the area covered by BS 110. Thus, there may be an initialization at 210 on an ongoing basis as LTE UE move into the BS service area. In one instance, initialization at 210 occurs once each time a new LTE UE enters the area serviced by BS 110.

Receiving the initialization signal at 210 may include BS 110 receiving initialization signals from each of IoT UEs 122-152. In some embodiments, receiving the initialization signal at 210 includes each of IoT UEs 122-152 performing part of an initial cell search and initial acquisition procedure by each IoT UE powering up and scanning for a suitable cell BS to camp on or be that UE's base station. In one instance, the initialization signal may contain information that allows the BS to send data transmissions back to the IoT UE. For example, after 210, BS 110 may be able to send data to an IoT UE at 220, or may be able to send a broadcast of synchronization information on an equivalent channel of a physical downlink control channel (PDCCH) to all of IoT UEs 122-152 as noted at 510 of FIG. 5A.

At 220 communication protocol information is sent by the BS to each of the LTE UEs in response to receiving the initialization signals at 210. Sending the communication protocol information at 220 may include BS 110 sending communication protocol information signals to each of IoT UEs 122-152. In some embodiments, sending communication protocol information at 220 includes each of IoT UEs 122-152 performing part of an initial cell search and initial acquisition procedure by the BS sending to each IoT UE:

frame timing, frequency offsets and a unique UE identification (IoT-BCID) for that IoT UE for that cell or BS. In one embodiment, the frequency offsets include frequency channels for data transmissions such as "$f_0$, $f_1$, $f_2$," and the like as described for FIG. 7, and the unique user equipment identification includes a IoT-BCID such as "$ID_0$-$ID_{199}$" as described for FIGS. 5A-7.

In some instances, each IoT UE is assigned a unique UE ID from the respective BS. In a cellular network, there could be multiple cells, and for each cell there is one BS. For the cellular network, the combination of BS IDs and UE IDs form unique combinations. For example, IDs of IoT UEs can be reused in different cells, but in each cell, each IoT UE ID (e.g., an IoT-BCID) is unique; and the BS may assign this ID to the IoT UE during initial acquisition (cell connection) procedure, such as at 220.

At 222 each LTE UE receives the communication protocol information that was sent by the BS at 220. Receiving the communication protocol information at 222 may include each of IoT UEs 122-152 receiving the communication protocol information signals sent by BS 110. In some embodiments, receiving the communication protocol information at 220 includes each of IoT UEs 122-152 performing part of an initial cell search and initial acquisition procedure by each IoT UE receiving the information sent by the BS at 220.

At 224 data transmissions may be sent to the BS by each of the LTE UEs using a cellular network communication protocol that is based on the communication protocol information received by each of the UEs at 222. In some cases, this cellular network communication protocol may be for IoT UE (mMTC) applications; or for an LTE, a 3G, a 4G or another known cellular network protocol, based on knowing the communication protocol information received. Sending the data transmissions at 224 may include each of the IoT UEs 122-152 sending the data transmissions to the BS 110 using an IoT uplink protocol that is based on the communication protocol information received by each of IoT UEs 122-152 at 222.

At 230 data transmissions may be received by the BS from each of the LTE UEs using an IoT uplink protocol that is based on the communication protocol information sent to each of the UEs at 220. Receiving the data transmissions at 230 may include receiving the data transmissions sent at 224. Receiving the data transmissions at 230 may include BS 110 receiving the data transmissions from each of IoT UEs 122-152 using an IoT uplink protocol that is based on the communication protocol information received by each of IoT UEs 122-152. In some embodiments, receiving the data transmissions from the UEs at 230 includes each of IoT UEs 122-152 sending data transmissions using an IoT uplink protocol that is based on the results off completing an initial cell search and initial acquisition procedure that includes descriptions at 210 and 220. In some instances, this IoT uplink protocol may also be based on descriptions of one or more of FIGS. 3-8.

Figure 3:
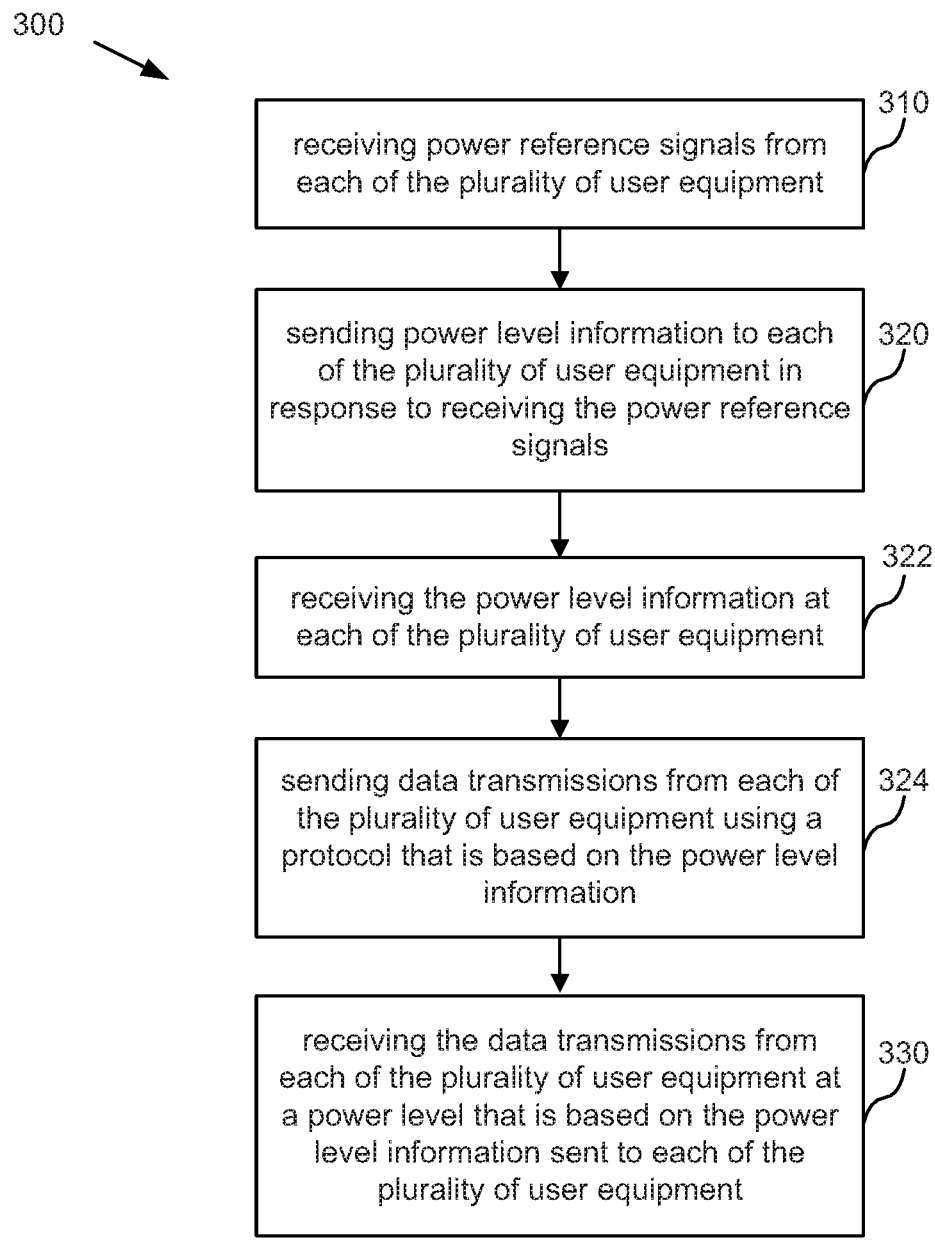
FIG. 3 is a flow diagram of a process for receiving data transmissions from UEs based on power level information sent the UEs, according to example embodiments.

According to embodiments, the IoT uplink protocol described herein may include each IoT UE adjusting the power it transmits data transmissions at by sending a reference signal (e.g., on a pilot channel such as in CDMA) and using open loop power control to avoid near-far effects at the BS. For example, FIG. 3 is a flow diagram of a process 300 for receiving data transmissions from UEs based on power level information sent the UEs, according to example embodiments. In one instance, process 300 occurs after process 200. Process 300 may be performed at or by BS 110 or system 103. In one instance, process 300 is also performed by IoT UEs 122-152. However, it can be appreciated that any component illustrated in FIGS. 1 and 8 may be employed to implement the process.

Process 300 begins at 310 where power reference signals are received by a BS from each of the LTE UEs it serves. Receiving the power reference signals at 310 may include BS 110 receiving power reference signals from each of IoT UEs 122-152. In some embodiments, receiving the power reference signals at 310 includes each of IoT UEs 122-152 performing part of an open loop power control process to avoid near-far effect by the IoT UE transmitting a reference signal, similar to a pilot channel in CDMA, to BS 110.

At 320 power level information is sent by the BS to each of the LTE UEs in response to the BS receiving the power reference signals at 310. Sending the power reference signals at 320 may include BS 110 sending power reference signals to each of IoT UEs 122-152. In some embodiments, sending power level information at 220 includes the BS performing part of an open loop power control process to avoid near-far effect by the BS sending to each IoT UE information describing what power level to transmit data transmissions at to avoid near field effect and far field effect at BS 110.

At 322 each LTE UE receives the power level information that was sent by the BS at 230. Receiving the power level information at 322 may include each of IoT UEs 122-152 receiving the power level information signals sent by BS 110. In some embodiments, receiving the power level information at 320 includes each of IoT UEs 122-152 performing part of an open loop power control procedure by each IoT UE receiving the information sent by the BS at 320.

At 324 data transmissions may be sent to the BS by each of the LTE UEs using an IoT uplink protocol that is based on the power level information received by each of the UEs at 322. Sending the data transmissions at 324 may include each of the IoT UEs 122-152 sending the data transmissions to the BS 110 using an IoT uplink protocol that is based on the power level information received by each of IoT UEs 122-152 at 222.

At 330 data transmissions may be received from each of the UEs at a power level that is based on the power level information sent to each of the plurality of user equipment at 320. Receiving the data transmissions at 330 may include receiving the data transmissions sent at 324. Receiving the data transmissions at 330 may include BS 110 receiving the data transmissions from each of IoT UEs 122-152 at a power level that is based on the power level information received by each of IoT UEs 122-152. In some embodiments, receiving the data transmissions from the UEs at 330 includes each of IoT UEs 122-152 sending data transmissions using an IoT uplink protocol that is based on the results off completing an open loop power control procedure that includes descriptions at 310 and 320. In some instances, this IoT uplink protocol may also be based on descriptions of one or more of FIGS. 2 and 4-8.

Figure 4:
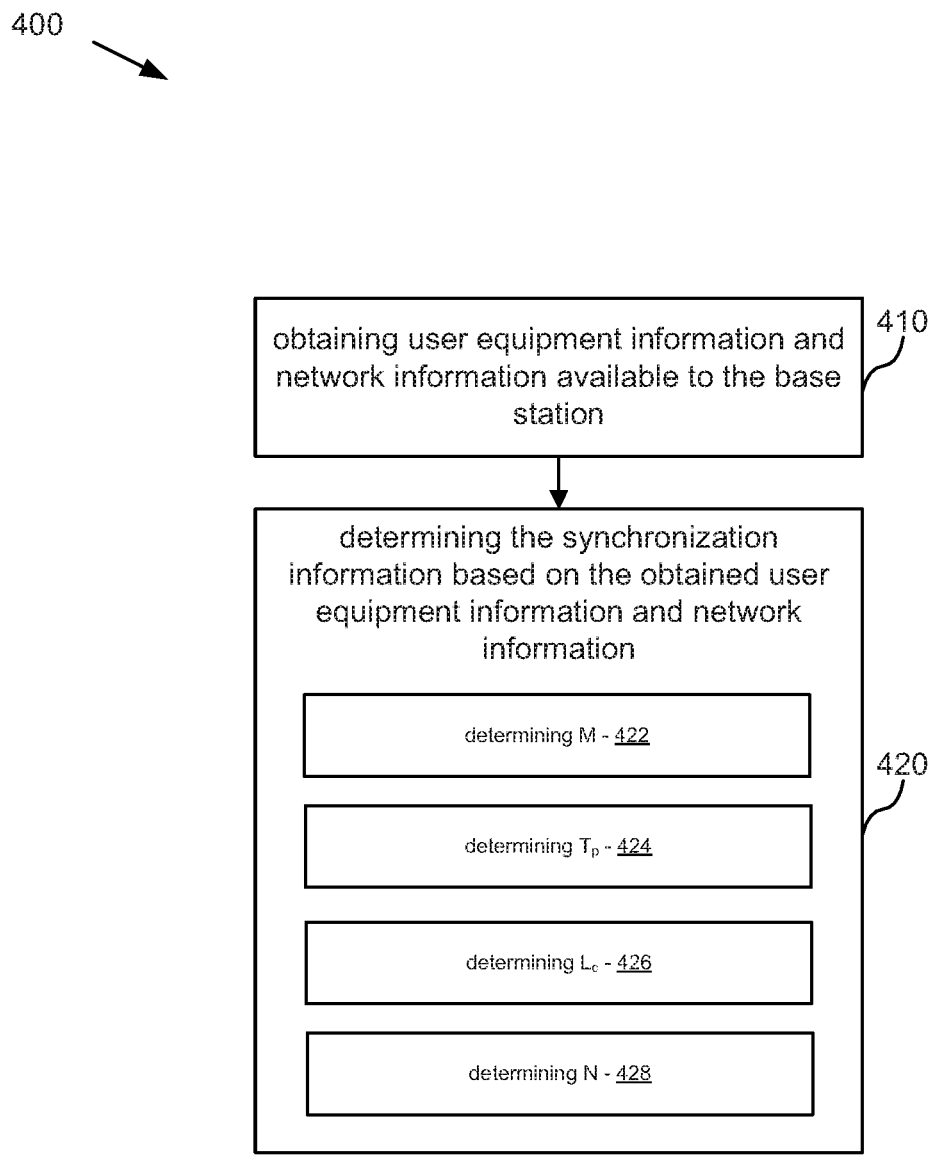
FIG. 4 is a flow diagram of a process for determining synchronization information to be broadcast by a base station (BS) based on certain information at the BS, according to example embodiments.

According to embodiments, the IoT uplink protocol described herein may include the BS determining synchronization information based on certain UE information and network information that is "know" information at the BS, such as information that stored at the BS or that the BS can obtain. For example, FIG. 4 is a flow diagram of a process 400 for determining synchronization information to be broadcast by a base station (BS) based on certain information at the BS, according to example embodiments. In one instance, process 400 occurs after process 300. Process 400 may be performed at or by BS 110 or system 103. However, it can be appreciated that any component illustrated in FIGS. 1 and 8 may be employed to implement the process.

Process 400 begins at 410 where LTE UE information and network information available for a cell a BS serves are obtained by the BS. In some embodiments, obtaining the user equipment information and network information at 410 may include BS 110 obtaining data that is available to it from IoT UEs 122-152 and network 120. In one example, the user equipment information and network information at 410 may include an uplink traffic demand from each LTE UE of network 120, a total number of those LTE UEs, a location of each of those LTE UEs, a total number of IoT UEs 122-152, and an IoT UE uplink traffic profile of IoT UEs 122-152 for network 120 or UEs served by BS 110. This traffic profile may include a data size and uplink data arrival distribution (e.g., over time) for data transmissions uplinked to the BS from IoT UEs 122-152.

At 420 synchronization information is determined by a BS based on the LTE UE information and network information obtained at 410. Determining synchronization information at 420 may include BS 110 using the information obtained at 410 to calculate a total number of the plurality of IoT UEs (M) the BS serves, a length of a spreading code ($L_c$) to be used by the IoT UEs to spread data for data transmissions, a time domain periodicity of available resources ($T_p$) for receiving data transmissions at the BS, and a maximum number (N) of the IoT UEs that the BS can simultaneously receive data transmissions from.

According to embodiments, determining synchronization information at 420 may include 422-428 as shown.

In one instance, determining synchronization information at 420 may include BS 110 using the total number of IoT UEs 122-152 obtained at 410 to calculate M at 422. In some embodiments, M is equal to the total number of IoT UEs 122-152 obtained at 410.

In one embodiment, determining synchronization information at 420 may include BS 110 using the type of network 120 that the BS serves or the type of cellular network that the BS serves to calculate $L_c$ at 424. In some embodiments, $L_c$ is a length of spreading code based on spread spectrum technology. In some cases, $L_c$ may be a set number according to a cellular network communication protocol for IoT UE (mMTC) applications; or an LTE, a 3G, a 4G or another known cellular network protocol, based on knowing the cellular network protocol of one or both of those of networks.

In some instances, determining synchronization information at 420 may include BS 110 using the uplink traffic demand from each LTE UE of network 120, the total number of those LTE UEs, the location of each of those LTE UEs, the total number of IoT UEs 122-152, and the IoT UE uplink traffic profile of IoT UEs 122-152 for network 120 or UEs served by BS 110 to calculate $T_p$ at 426. In some embodiments, $T_p$ is calculated by balancing the maximum allowable available resources for receiving LTE UE and IoT UE data transmissions at the BS, with the uplink traffic demand from each LTE UE of network 120, and with the IoT UE uplink traffic profile of IoT UEs 122-152 for network 120. This balancing may include prioritizing the LTE UE uplink demand as compared to the IoT UE uplink traffic demand. It is considered that $T_p$ may be adjusted over time if this prioritizing is changed by the BS. It is also considered that $L_c$ may be adjusted over time if this prioritizing is changed by the BS.

In some embodiments, determining synchronization information at 420 may include BS 110 using the uplink traffic demand from each LTE UE of network 120, the total number of those LTE UEs, the location of each of those LTE UEs, the total number of IoT UEs 122-152, and the IoT UE uplink traffic profile of IoT UEs 122-152 for network 120 or UEs served by BS 110 to calculate N at 428. In some instances N is calculated by balancing the maximum number of the LTE UEs that the BS can simultaneously receive data transmissions from, with the uplink traffic demand from each LTE UE of network 120, and with the IoT UE uplink traffic profile of IoT UEs 122-152 for network 120. This balancing may include prioritizing the LTE UE uplink demand as compared to the IoT UE uplink traffic demand.

According to embodiments, M, $L_c$, $T_p$ or N are determined at 420 using engineering parameters that are fixed based on the traffic load between the BS and LTE UEs, and radio capacity planning details for a given cell BS. In some cases they are operator dependent, such as depend on the technical capabilities of the cell BS. For some embodiments, they may change every one or more hours.

In some embodiments, the synchronization information determined at 420 may be broadcast to IoT UEs 122-152 to provide an implicit schedule for each IoT UE to use to transmit IoT data in data transmissions to a BS using the IoT uplink protocol described herein. The IoT UEs can use this information to calculate a schedule having details in terms of (1) CDMA spreading code, $C_i$, to spread IoT data before transmitting the data in an uplink, (2) time slot number, $T_i$, in which an UE can transmit IoT data. In some instances, this IoT uplink protocol may also be based on descriptions of one or more of FIGS. 2-3 and 5-8.

More particularly, the schedule can be calculated by performing the computation of [$C_i$, $T_i$] at IoT UEs by applying a mathematical operation to the broadcasted information. In some instances the mathematical operation may be described as a simple mathematical operation, such as modulo, division and hash function. It is also considered that the mathematical operation may be described as a data analytics or a hash function. Notably, this can be done without exchanging one-to-one handshake messages between IoT UE and BS prior to transmitting an uplink; and without consuming the BS and UE time, power and resources used to exchange those messages.

In some instances, the IoT uplink protocol described herein may be based on factors such as: (1) that data communications for IoT UE (mMTC) applications is dominated by uplink communications from IoT UEs to the BS, unlike dominant downlink traffic in existing 4G/LTE; and (2) that a majority of IoT UE uplink data communications traffic (80-95 percent of such traffic) is periodic updates from IoT UE, and thus, time slots can be scheduled for IoT UEs according to a schedule as proposed.

For one embodiment, the IoT uplink protocol described herein may include assumptions such as: (1) that periodic data communications uplink traffic or update data from the IoT UEs is delay tolerant, such as being tolerant to a delay of 1 to 10 seconds without impact on the UEs application as opposed to video downlink streaming which cannot tolerate such delay; (2) uplink power control can be used by the IoT UE to avoid near-far effect in CDMA that are caused when the BS receives uplink data transmissions having large variations in power from the UEs; and (3) time synchronization can be used to maintain orthogonality in time slots for uplink data transmissions from the IoT UEs.

Figure 5A:
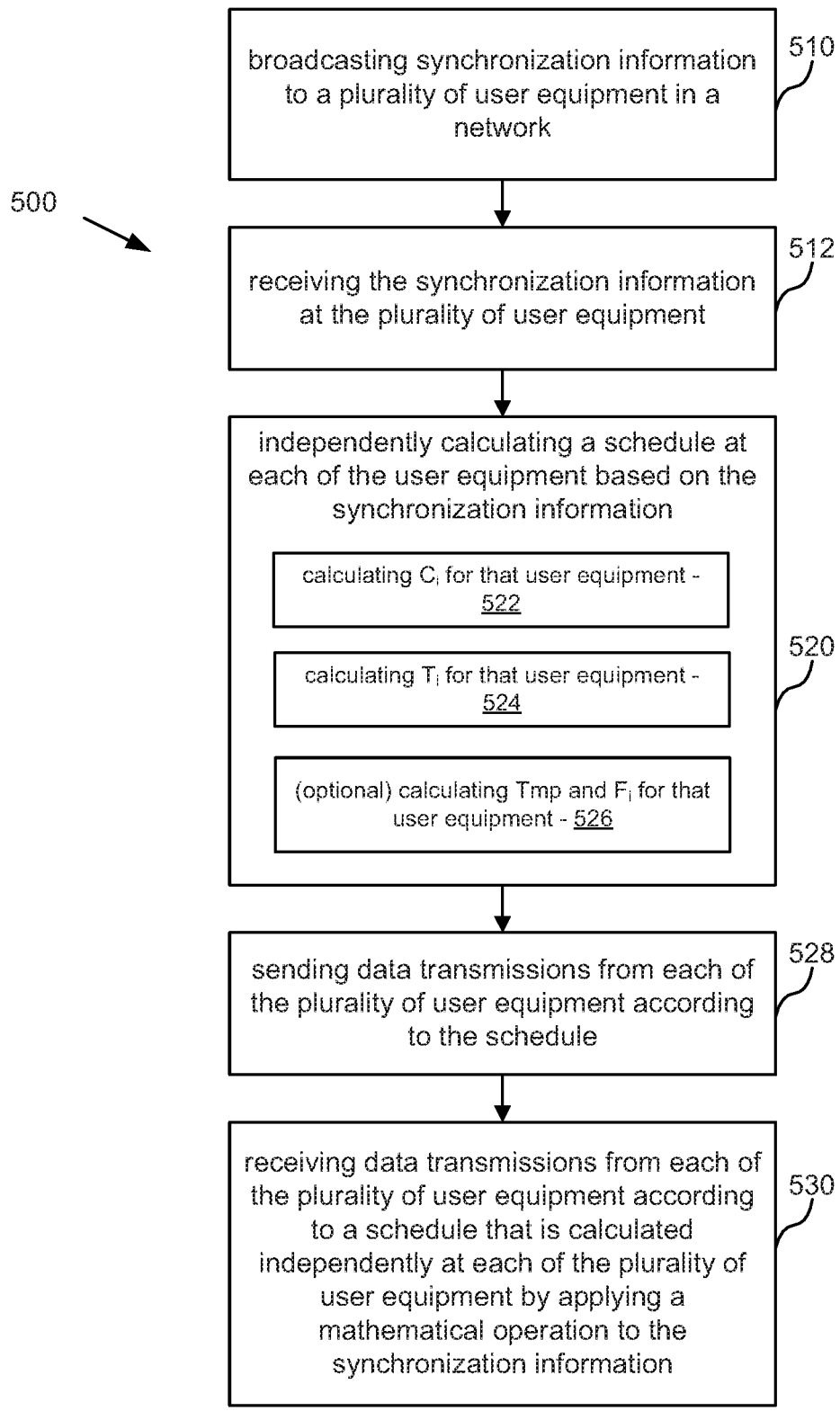
FIG. 5A is a flow diagram of a process for receiving data transmissions from UEs according to a schedule that is calculated independently at each UE, according to example embodiments.

According to embodiments, the IoT uplink protocol described herein may include the BS simultaneously transmitting synchronization information having data scheduling parameters to all of the IoT UEs; and the UEs applying a mathematical operation such as data analytics to the synchronization information to calculate an IoT uplink data transmission schedule. For example, FIG. 5A is a flow diagram of a process 500 for receiving data transmissions from IoT UEs 122-152 according to a schedule that is calculated independently at each UE based on synchronization information broadcast by BS 110, according to example embodiments. In one instance, process 500 occurs after process 400. Process 500 may be performed at or by BS 110 or system 103. In one instance, process 500 is also performed by IoT UEs 122-152. However, it can be appreciated that any component illustrated in FIGS. 1 and 8 may be employed to implement the process.

Process 500 begins at 510 where synchronization information is broadcast by a BS to a number of IoT UEs the BS serves in a network. Broadcasting synchronization information at 510 may include BS 110 broadcasting a signal having synchronization information for all IoT UEs of network 120 to use when sending uplink data transmissions to the BS. In some embodiments, broadcasting the synchronization information at 510 includes BS 110 broadcasting the signal on an equivalent channel of PDCCH to all of IoT UEs 122-152.

According to embodiments, the synchronization information broadcast at 510 includes a total number of IoT UEs (M) in the network (e.g., M=16 for IoT UEs 122-152), a length of a spreading code ($L_c$) to be used by each IoT UE to spread data for each of its uplink data transmissions, a time domain periodicity of available resources ($T_p$) for each IoT UE to transmit the uplink data transmissions, and a maximum number (N) of the IoT UEs that can simultaneously uplink data transmissions to the BS.

At 512 each IoT UE receives the synchronization information that was sent by the BS at 510. According to embodiments, receiving the synchronization information at 512 provides an implicit schedule for each of IoT UEs 122-152 to use to transmit IoT data transmissions to BS 110, without interfering with uplink data transmissions of any of the other of IoT UEs 122-152 to BS 110.

At 520 a schedule is independently calculated at each of the IoT UEs for sending data transmissions to the BS that is based on the synchronization information received by each of the UEs at 512. In some embodiments, at 520 the schedule is independently calculated at a BS serving all of the IoT UEs, and is based on the synchronization information sent by the BS to each of the UEs at 512 (e.g., see FIG. 5B). In one case, calculating a schedule at 520 may be part of an IoT uplink protocol as described herein. In some embodiments, calculating a schedule at 520 may also be based on descriptions of one or more of FIGS. 6-8.

According to embodiments, calculating a schedule at 520 may include 522-526 as shown.

In one instance, calculating a schedule at 520 may include each of IoT UEs 122-152 independently calculating $C_i$ for that UE at 522 using the synchronization information received by each of the UEs at 512. In some embodiments, $C_i$ is a spreading code as noted herein. In some embodiments, calculating $C_i$ at 522 may also be based on descriptions of one or more of FIGS. 6-7.

In one instance, calculating a schedule at 520 may include each of IoT UEs 122-152 independently calculating $T_i$ for that UE at 524 using the synchronization information received by each of the UEs at 512. In some embodiments, $T_i$ is time slots as noted herein. In some embodiments, calculating $T_i$ at 524 may also be based on descriptions of one or more of FIGS. 6-7.

In one instance, calculating a schedule at 520 may include each of IoT UEs 122-152 optionally, independently calculating $F_i$ and TmpID for that UE at 526 using the synchronization information received by each of the UEs at 512. In some embodiments, $F_i$ is a frequency channel or spread as noted herein. In some embodiments, TmpID is a temporary identification as noted herein. In some embodiments, optionally calculating $F_i$ and TmpID at 526 may also be based on descriptions of one or more of FIGS. 6-7.

At 528 data transmissions may be sent to the BS by each of the IoT UEs using the schedule calculated at 520. Sending the data transmissions at 528 may include each of the IoT UEs 122-152 sending the data transmissions to the BS 110 using an IoT uplink protocol that includes the schedule calculated at 520 by each of IoT UEs 122-152 at 514. In some embodiments, sending data transmissions at 528 may also be based on descriptions of one or more of FIGS. 6-7.

At 530 data transmissions may be received by a BS from each of the IoT UEs the BS serves as sent at 528, and/or according to a schedule that is calculated independently at each of the IoT UEs at 514. Receiving the data transmissions at 530 may include BS 110 receiving the (e.g., uplink) data transmissions from each of IoT UEs 122-152 at 528, according to a schedule calculated at 520, or based on applying a mathematical operation to the synchronization information broadcast to all of the IoT UEs 122-152 at 510. In some embodiments, receiving the data transmissions from the IoT UEs at 530 includes each of IoT UEs 122-152 sending data transmissions using an IoT uplink protocol that is based on the schedule calculated at 520. In some instances, this IoT uplink protocol may also be based on descriptions of one or more of FIGS. 2-4 and 6-8.

In some embodiments, calculating the schedule at 520 includes each IoT UEs 122-152 independently calculating the schedule by applying the same mathematical operation to the synchronization information broadcast to all of the IoT UEs at 510.

For example, for BS 110 or a single cell, the UE uses its unique ID to calculate both spreading code index $C_i$ and time slot $T_i$. Thus, the combination of spreading code and time slot $[C_i, T_i]$ is unique since unique UE ID has been used. Also, for some embodiments, it means this information can be available at or to each respective IoT UE and the cell BS, without another IoT UE knowing it. In other words, any one IoT UE does not have be aware of schedule information of other IoT UEs in order for that one IoT UE to communicate with the BS. However, while each IoT UE does not have to know or care about a $[C_i, T_i]$ for another IoT UE; each UE could and is capable of calculating the $[C_i, T_i]$ of any other UE if it knows the UE ID of the other UE. Put another way, to communicate with the BS, UEID$_2$ might calculate the $[C_2 T_2]$ for that UE; but if it wanted to know the schedule for UEID$_3$, it could calculate $[C_3 T_3]$ as well. It is noted that in some embodiments, the UE IDs are configurable and does not remain constant throughput the life cycle of an IoT UE. In this case, the BS or network can update the UE ID of an IoT UE on a large time scale, periodically, or due to a change in N, M, $L_c$ or $T_p$.

As previously discussed, for spreading code size $L_c$, up to $L_c$ codes are available for all the IoT UEs of the cell. In most cases, this $L_c$ is a finite number and will much smaller number than total number of IoT UEs in the network or cell. So it is not possible for the BS to assign a unique spreading code to each IoT UE due to the scarcity of there being a typical limit of up to $L_c$ spreading codes for a much greater number of IoT UEs. Some embodiments overcome this challenge by assigning or calculating a unique $[C_i, T_i]$ combination at each IoT UE so no two IoT UEs will both have the same $[C_i, T_i]$. for example, each spread code can be used by multiple IoT UEs in the cell because by using a mathematical operation at all of the IoT UEs, in any time slot $T_i$, no two or more IoT UEs can use the same spreading code according to the schedule.

In some embodiments, a Walsh code is generated to be the spread code. For example, for given length of spreading code, $L_c$, there is particular way of calculating all Lc spreading codes with predefined mathematical function or as a Wash code. In some instances, this mathematical function may create a matrix of size $L_c$-by-$L_c$ and each row of the matrix is one spreading code. For these instances, creating all spreading codes can be an operation of mathematical complexity log ($L_c$), which is a low complexity mathematical operation even for an IoT UE's calculation capability. For example, each IoT UE can calculate the $L_c$-by-$L_c$ matrix with the predetermined mathematical function, and all IoT UEs will create exact same spread code matrix. Consequently, some embodiments include a proposed mathematical function that generates a time slot index $T_i$ and spreading code index $C_i$ for each IoT UE. For example, an IoT UE can use a row number Cx of the matrix as the spreading code.

Figure 5B:
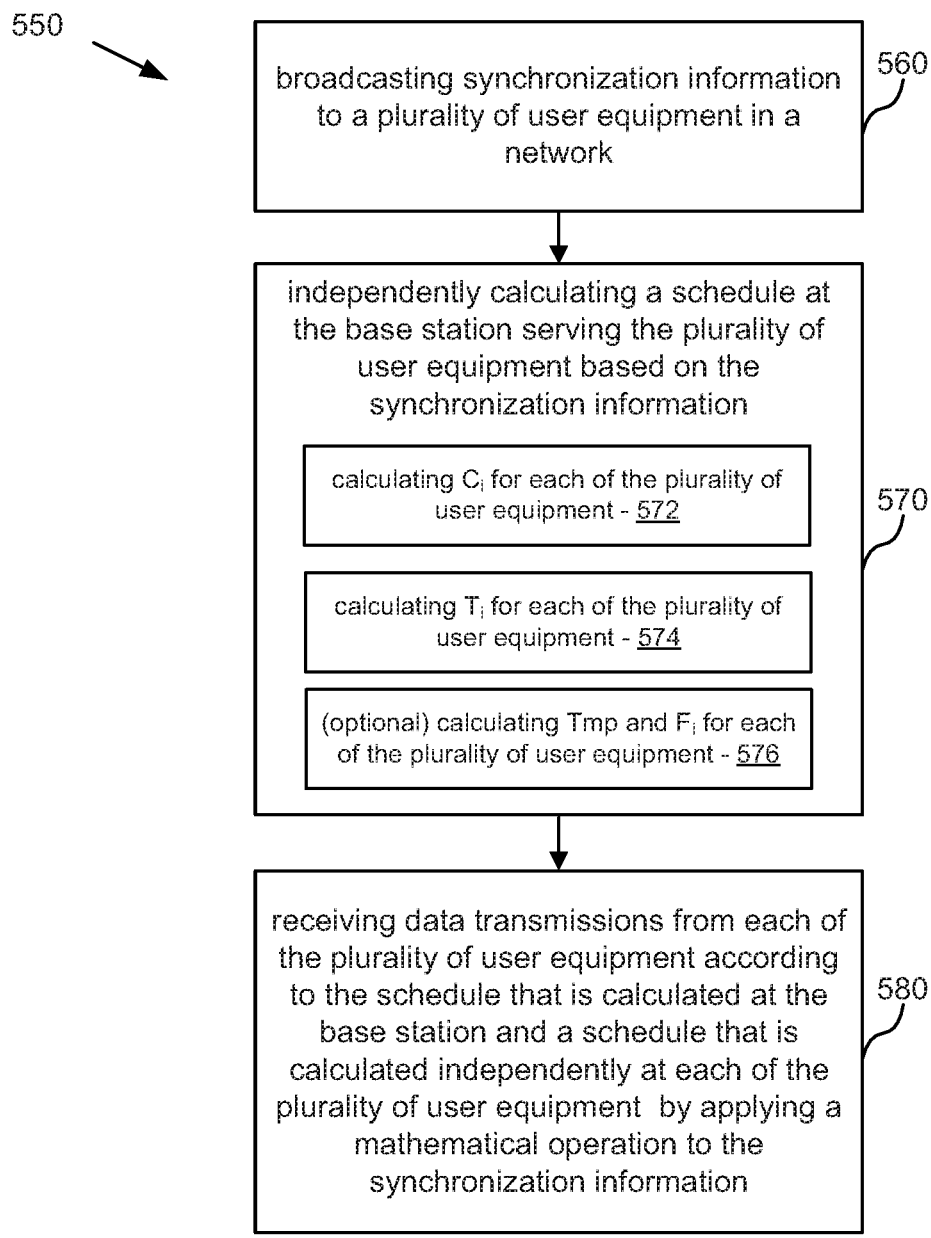
FIG. 5B is a flow diagram of a process for receiving data transmissions from UEs according to a schedule that is calculated independently by a BS serving a number of UEs, according to example embodiments.

According to one embodiment, BS 110 may also independently calculate the schedule described at 520, such as using the synchronization information the BS broadcasts. By calculating the schedule, the BS knows when to expect the uplink data transmissions from all of the IoT UEs at 530. It is noted that although this schedule is calculated independently by each of the IoT UEs (and by the BS), it may be the same schedule because it is calculated using the same mathematical operation or data analytics and the same synchronization information. For example, FIG. 5B is a flow diagram of a process 550 for receiving data transmissions from UEs according to a schedule that is calculated independently by BS 110 serving IoT UEs 122-152, according to example embodiments. Process 550 may be performed at or by BS 110 or system 103. In one instance, process 500 is also performed by IoT UEs 122-152. However, it can be appreciated that any component illustrated in FIGS. 1 and 8 may be employed to implement the process.

Process 550 begins at 560 where synchronization information is broadcast by a BS to a number of IoT UEs the BS serves in a network. Broadcasting synchronization information at 560 may be the same as at 510.

At 570 a schedule is independently calculated at the BS serving the number of IoT UEs based on the synchronization information that was broadcast. For example, calculating a schedule at 570 may include independently calculating a schedule at BS 110 for receiving data transmissions at the BS from IoT UEs 122-152 that is based on the synchronization information broadcast at 560. In one case, calculating a schedule at 570 may be part of an IoT uplink protocol as described herein. In some embodiments, calculating a schedule at 570 may also be based on descriptions of one or more of FIGS. 6-8. For some embodiments, calculating a schedule at 570 may be the same as at 520 except that 570 is performed independently by the BS for all of the IoT UEs while 520 is performed independently by each IoT UE.

According to embodiments, calculating a schedule at 570 may include 572-576 as shown.

In one instance, calculating a schedule at 570 may include BS 110 independently calculating $C_i$ for each of the UEs at 572 using the synchronization information broadcast at 560. For some embodiments, calculating $C_i$ at 572 may be the same as at 522 except that 572 is performed independently by the BS for all of the IoT UEs while 522 is performed independently by each IoT UE. In some embodiments, calculating $C_i$ at 572 may also be based on descriptions of one or more of FIGS. 6-7.

In one instance, calculating a schedule at 570 may include BS 110 independently calculating $T_i$ for each of the UEs at 574 using the synchronization information broadcast at 560. For some embodiments, calculating $T_i$ at 574 may be the same as at 524 except that 574 is performed independently by the BS for all of the IoT UEs while 524 is performed independently by each IoT UE. In some embodiments, calculating $T_i$ at 574 may also be based on descriptions of one or more of FIGS. 6-7.

In one instance, calculating a schedule at 570 may include BS 110 optionally, independently calculating $F_i$ and TmpID for each of the UEs at 576 using the synchronization information broadcast at 560. For some embodiments, calculating $F_i$ and TmpID at 576 may be the same as at 526 except that 576 is performed independently by the BS for all of the IoT UEs while 526 is performed independently by each IoT UE. In some embodiments, calculating $F_i$ and TmpID at 576 may also be based on descriptions of one or more of FIGS. 6-7.

At 580 data transmissions may be received from each of the number of IoT UEs according to the schedule that is calculated at the BS and/or a schedule that is calculated independently at each of the number of the IoT UEs by applying a mathematical operation to the synchronization information broadcast at 560. For example, receiving data transmissions at 580 may include receiving data transmissions at BS 110 according to a schedule independently calculated at 570. In one case, receiving data transmissions at 580 may be part of an IoT uplink protocol as described herein. In some embodiments, receiving data transmissions at 580 may also be based on descriptions of one or more of FIGS. 6-8. For some embodiments, receiving the data transmissions at 580 may include BS 110 receiving the (e.g., uplink) data transmissions from each of IoT UEs 122-152 as described at 530.

In one case, calculating the schedule at 520 (e.g., at 520 and at 570) includes using data analytics to calculate an IoT data schedule based on LTE UE density in network 120 such that the LTE interference targeted bit error rate is reduced or managed for data transmissions from all of the LTE UEs served by BS 110.

Figure 6:
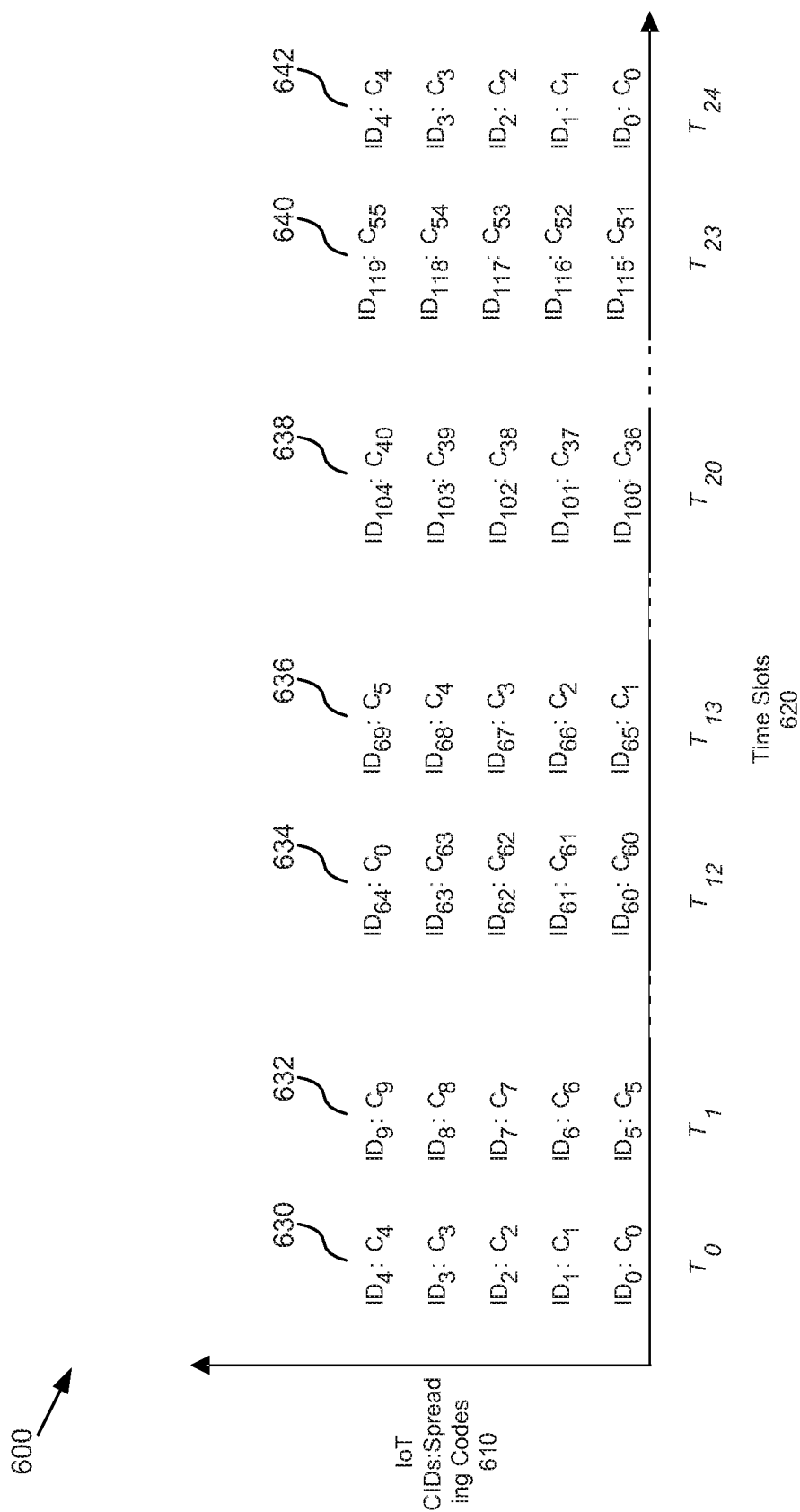
FIG. 6 is a chart showing spreading codes and time slots for receiving data transmissions from UEs according to a schedule that is calculated independently at each UE, according to example embodiments.

In some embodiments, calculating the schedule at 520 may be based on or include a spreading code $C_i$ at 522 for each of IoT UE of a BS to spread data for the uplink data transmissions and a time slot number $T_i$ at 524 in which each of the IoT UEs is to transmit the uplink data transmissions to the BS. For example, FIG. 6 is a chart 600 showing spreading codes and time slots for receiving data transmissions at a BS from IoT UEs according to a schedule that is calculated independently at each UE, according to example embodiments. In some cases, chart 600 is an example of a code multiplexing schedule for uplinking data transmissions from IoT UEs of a cell to a BS that serves those UEs. This example is for illustration purposes only, and is a specific application of certain embodiments described herein. In one instance, chart 600 is an example of a schedule calculated according to process 500, such as being calculated as described at 520.

Chart 600 shows vertical axis of spreading codes 610 and horizontal axis of time slots 620. It shows one of columns 630-642 at each of time slots $T_1$-$T_{24}$; and each column having 5 rows (e.g., N in our example, though in other cases the number of rows can be fewer or more than 5) of pairs of (IoT UE's BCID numbers: spread codes) shown as pairs of $ID_x$:$C_y$. Chart 600 and the information below may be used to describe an example process for calculating a data transmission schedule having spreading codes, time slots [$C_i$, $T_i$] for each IoT UE having UE identification (IoT-BCID)$_i$ (which is referred to in chart 600 as identification number UE$_i$) using the mathematical operations:

Assignment of spreading codes: $C_i=(IoT\text{-}BCID)_i \bmod L_c$

Assignment of time slots: $T_i=\text{floor}((IoT\text{-}BCID)_i)/N$

For embodiments of the IoT uplink protocol described herein, "mod" may apply the length (e.g., number) of spreading codes available $L_c$ to the number of IoT UEs or BCIDs to assign spreading codes $C_i$ at 522. Also, for embodiments of the IoT uplink protocol described herein, "floor" may apply the maximum number (N) of the IoT UEs that can simultaneously uplink data transmissions to the BS to the number of IoT UEs or BCIDs to assign time slots $T_i$ at 524.

In this example, the total number of IoT UEs in the cell is M=120; the maximum number of the IoT UEs that can simultaneously uplink data transmissions to the BS is N=5; and the length of a spreading code to be used by each IoT UE to spread data for its uplink data transmissions is $L_c$=64. In some embodiments N may be cell network 102 deployment dependent such as by being based on the whole bandwidth can be used to communicate between the BS and all LTE UEs. In one instance N is based on the maximum number of the IoT UEs that can simultaneously operate as CDMA-based IoT UEs. N may be is based on factors including the number of IoT UEs and the number of non-IoT LTE UEs that the BS is servicing. For example, decreasing the number of non-IoT UEs being serviced can increase N.

An equation may be used to calculate the higher bound on the value of N, which may describe number of IoT UEs which can operate to uplink data to the BS at the same time. For example, this equation may depend on the interference (e.g., if LTE UEs are sharing bandwidth at the same time to uplink to the BS), the IoT UE's transmit power (there may be some constraint on this as well) and an affordable packet error rate for IoT UE uplink's (if a desired packet error rate is very low, then a higher bound on N will decrease and vice-versa).

In this example, since M=120, the IoT-BCIDs are assigned from [0, 1, ..., 119]. Since the spreading codes are assigned by $C_i=(\text{IoT-BCID})i \bmod L_c$, the IoT UEs with IDs [0, 1, ..., 119] use the spreading codes as [0, 1, 2, ..., 63, 0, 1, ..., 54, 55], respectively. In more detail, since our example has an $L_c$ of 64 (e.g., [0, 1, 2, ..., 63]) and a number of IoT UE BCIDs of 120 (e.g., [0, 1, 2, ..., 119]), $C_i$ will be [0, 1, 2, ..., 63, 0, 1, 2, ..., 55]. In some cases, the use of "mod" here may be use of the mathematical function "modulo" where "(number of IoT UE BCIDs) mod (length of spread codes available $L_c$)" evaluates to a quotient of 1× the length of spread codes available $L_c$ which is [0, 1, 2, ..., 63], and a number of the IoT UE BCIDs that is the remainder of the division of the IDs by the $L_c$ which is [0, 1, 2, ..., 54].

Also, in this example, since N=5 each column of chart 600 at $T_x$ has 5 rows in which IoT UEs can simultaneously transmit, data transmissions by the IoT-BCIDs are assigned 5 at a time as [0, 0, 0, 0, 0, 1, 1, 1, 1, 1, 2, 2, ...] for each of time slots of $T_0, T_1, T_2, ...$. Since the time slots are assigned by $T_i=\text{floor}((\text{IoT-BCID})_i/N)$, the IoT UEs with IDs [0, 1, ..., 119] transmit in time slots [0, 0, 0, 0, 0, 1, 1, 1, 1, 1, ..., 23, 23, 23, 23, 23], respectively. In more detail, since our example has an N of 5 (e.g., [0, 0, 0, 0, 0, 1, 1, 1, 1, 2, 2, ...]) and the number of IoT UE BCIDs is 120 (e.g., [0, 1, 2, ..., 119]), $T_i$ will be assigned to all of the IoT UEs within time slots [0, 0, 0, 0, 0, 1, 1, 1, 1, 1, 2, 2, ..., 23, 23, 23, 23, 23], and then $T_i$ will repeat for the IoT UEs at $T_{24}$.

In some cases, the use of "floor" here may be use of the mathematical function "floor/ceil" where "floor of ((number of IoT UE BCIDs)/N)" evaluates to time slots of $T_0$-$T_{23}$ each having N=5 spots for IoT UEs that can simultaneously uplink data transmissions to the BS. In this case, each IoT UE can uplink a data transmission every $T_{24}$ time slots identified in for that IoT UE's BCID number and using the spread code $C_i$ identified in for that IoT UE's BCID number. For example, each IoT UE of BCID [0, 1, ..., 119] spreads the data it is to transmit using its spread codes $C_x$ associated with that UE's BCID number $ID_x$ and transmits data transmissions during its time slots $T_x$ associated with that UE's BCID number $ID_x$ in the schedule at 528.

For this example, since N=5 and M=120, it will require 24 total slots for each IoT UE to transmit at least once, thus 24 is the time periodicity $T_p$, and the next possible data transmission slot for an IoT UE is:

$T_i+1=\text{floor}((IoT\text{-}BCID)_i/N)+T_p$

As noted above, $T_p$ may also be described as a time domain periodicity of available resources for each IoT UE to transmit the uplink data transmissions. For some embodiments, since the BS knows or can access the information used to calculate $T_p$ as noted above, the calculation above can be used to calculate $T_p$ at 426.

In our example, column 630 of chart 600 includes N=5 transmissions at time $T_0$ for pairs of $ID_{0-4}$ using spreading codes $C_{0-4}$. Column 632 includes the next N=5 transmissions at time $T_1$. At column 634 the first 64 spread codes have been used and so the final N=5 transmission at time $T_{12}$ cycles to the pair of $ID_{64}$ using next cycle of spreading code $C_0$. Column 636 includes the next N=5 transmissions at time $T_{13}$. Column 638 includes the next N=5 transmissions at time $T_{20}$. At column 640 the first 120 IoT UE IDs are satisfied at the final N=5 transmissions at time $T_{23}$ with the pair of $ID_{119}$ and spreading code $C_{55}$. At column 642 since the first 120 IoT UE IDs have been satisfied by having had a time slot and spread code in the schedule in which to transmit data, the first N=1 transmission at time $T_{24}$ cycles to the pair of the next cycle of $ID_0$ and restarts using spreading code $C_0$.

In some embodiments, if N does not divide evenly into M, the schedule could contain some empty pair locations, but those locations would number fewer than N. For instance, if in our example, if M=118 (instead of 120), then time $T_{23}$ would not be filled with 5 scheduled transmissions, but may end at $ID_{117}:C_{53}$ and have two empty slots above that entry. It can be appreciated that a number of empty slots<N may not be a major factor in transmission efficiency according to the IoT uplink protocol described herein.

It is considered that other embodiments of the IoT uplink protocol described herein applying the mathematical operations noted in the example for FIG. 6 above to BSs or cells having different numbers for M, N, $T_p$, and/or $L_c$. Thus, FIG. 6 may provide one or more example of calculating the schedule at 520 and sending data transmissions at 528.

In some embodiments, the synchronization information broadcast by the BS at 510 may further include a multiplexing frequency (e.g., see "$f_0, f_1, f_2$" at 20 of FIG. 2) used by the IoT UEs to schedule sending the data transmissions to the BS; and calculating the schedule at 520 may further include an assignment of the multiplexing frequencies for each of the IoT UEs to use to send the data transmissions to the BS at 526. For example, the schedule calculated at 520 may be based on or include frequency offsets for receiving data transmissions at the BS as well as the spreading codes $C_i$ for each of IoT UE of a BS to spread data for the uplink data transmissions and a time slot numbers $T_i$ in which each of the IoT UEs is to transmit the uplink data transmissions to the BS. In this case, the addition of frequency multiplexing at 526 along with code $C_i$ at 522, and time $T_i$ multiplexing at 524 can increases IoT network capacity by multiplying the number of uplink data transmissions that the BS can receive from the IoT UEs for each time slot $T_i$. This multiplication may be by the number of frequencies available for multiplexing, increases the data arrival rate of the uplinks and decreases network latency for receiving IoT data transmissions at the BS.

Figure 7:
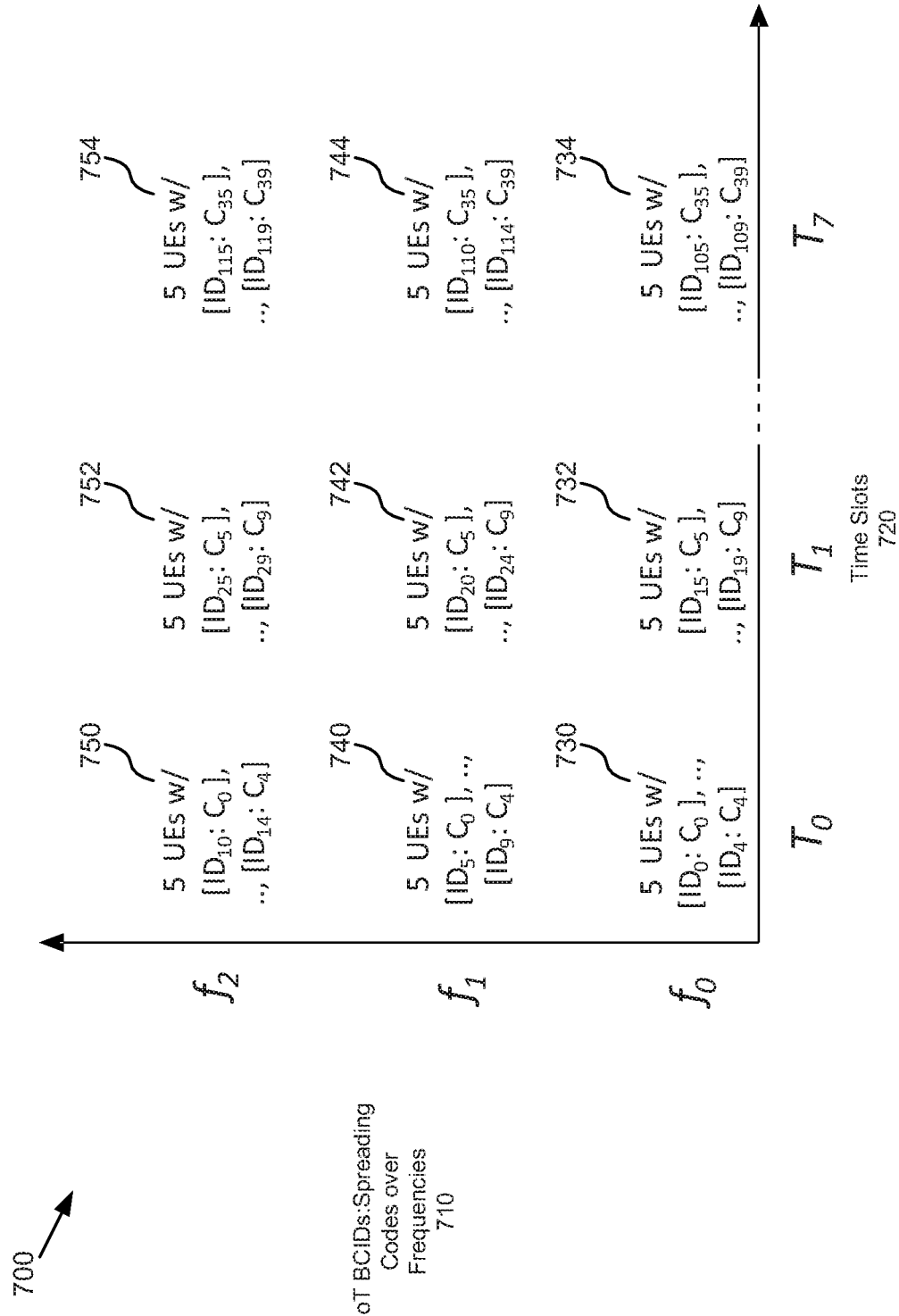
FIG. 7 is a chart showing spreading codes over frequencies and time slots for receiving data transmissions from UEs according to a schedule that is calculated independently at each UE, according to example embodiments.

For example, FIG. 7 is a chart 700 showing spreading codes over frequencies and time slots for receiving data transmissions at a BS from IoT UEs according to a schedule that is calculated independently at each UE, according to example embodiments. In some cases, chart 700 is an example of a code multiplexing schedule for uplinking data transmissions from IoT UEs of a cell to a BS that serves those UEs. This example is for illustration purposes only, and is a specific application of certain embodiments described herein. In one instance, chart 700 is an example of a schedule calculated according to process 500, such as being calculated as described at 520.

Chart 700 shows vertical axis of spreading codes over frequencies 710 and horizontal axis of time slots 720. It shows entries 730-754 across time slots $T_1$-$T_7$; and each entry having 5 rows (e.g., N) of pairs of (IoT UE's BCID numbers:spread codes) shown as pairs of $ID_x$:$C_y$. Specifically, chart 700 shows entries 730, 740 and 750 at frequency offsets $f_0$, $f_1$, and $f_2$, respectively of time slot $T_0$; entries 732, 742 and 752 at frequency offsets $f_0$, $f_1$, and $f_2$, respectively of time slot $T_1$; and entries 734, 744 and 754 at frequency offsets $f_0$, $f_1$, and $f_2$, respectively of time slot $T_2$.

Chart 700 and the information below may be used to describe an example of a process for calculating a data transmission schedule having spreading codes, time slots, and frequencies [$C_i$, $T_i$, $F_i$] for each IoT UE having UE identification (IoT-BCID)$_i$ (which is referred to in chart 700 as identification number $UE_i$) using the mathematical operations:

Assignment of frequency channels: $F_i=(IoT\text{-}BCID)_i$
$\mod f_n$ $(TmpID)_i=ceil((IoT\text{-}BCID)_i)/f_n$ Assignment of spreading codes: $C_i=(TmpID)_i \mod L_c$ Assignment of time slots: $T_i=ceil((TmpID)_i)/N$ For embodiments of the IoT uplink protocol described herein, "mod" may apply the number of frequency offsets available fn to the number of IoT UEs or BCIDs to assign frequency channels $F_i$ at 528. Also, for embodiments of the IoT uplink protocol described herein, "ceil" may apply the number of frequency offsets available $f_n$ to the number of IoT UEs or BCIDs to obtain a temporary identification TmpID at 528. Next, for embodiments of the IoT uplink protocol described herein, "mod" may apply the length (e.g., number) of spreading codes available $L_c$ to the temporary identification TmpID to assign spreading codes $C_i$ at 522. Finally, for embodiments of the IoT uplink protocol described herein, "ceil" may apply the maximum number (N) of the IoT UEs that can simultaneously uplink data transmissions to the BS to the temporary identification TmpID to assign time slots $T_i$ at 524.

In some embodiments, this example extends the example above from FIG. 6, with the additional information of the number of frequency offsets or channels available being $f_n=3$, such as where M=120, N=5, and $L_c=64$.

In this example, since the frequency channels $F_i$ are assigned $F_i=(IoT\text{-}BCID)i \mod f_n$, the IoT UEs with IDs [0, 1, . . . , 119] are assigned frequency channels with indices as [0, 1, 2, 0, 1, 2, . . . , 0, 1, 2], respectively. There may be 40 instances of repeating frequency indices [0, 1, 2].

Also, in this example, since the temporary identification TmpID is assigned by $(TmpID)=ceil((IoT\text{-}BCID)_i)/f_n$, that ID may be "ceil" applying the number of frequency offsets available $f_n=3$ to the number of IoT UEs or BCIDs [0, 1, . . . , 119] to obtain a temporary identification TmpID=40, which is the number of IDs per each frequency $f_0$, $f_1$, and $f_2$ of repeating frequency indices [0, 1, 2].

Next, in this example, since and TmpID=40 and the spreading codes are assigned by $C_i=(TmpID)_i \mod L_c$, the IoT UEs with IDs [0, 1, . . . , 119] are assigned spreading codes as [0, 1, 2, . . . , 39], respectively. Here, up to 40 spreading codes are used for the 120 IoT UEs because a set (e.g., $C_{0\text{-}4}$) those codes can be reused during any one of the three frequency offset of each time slot $T_i$ due to the frequency multiplexing.

Finally, in this example, since TmpID=40 and time slots are assigned by $T_i=ceil((TmpID)_i)/N$, the IoT UEs with IDs [0, 1, . . . , 119] are assigned time slots $T_0$ for IDs [0, 14], $T_1$ for IDs [15, 29], . . . , $T_7$ for IDs [105, 119] for uplinking data transmissions, respectively. Here, it only takes from time slot $T_0$ to $T_7$ for each of the IoT UEs to uplink a data transmission to the BS, as compared to 3× longer in the example of FIG. 6.

In this case, each IoT UE can uplink a data transmission every $T_8$ time slots identified for that IoT UE's BCID number and using the frequency channels $F_i$ and the spread code $C_i$ identified in for that IoT UE's BCID number. For example, each IoT UE of BCID [0, 1, . . . , 119] spreads the data it is to transmit using its spread codes $C_x$ associated with that UE's BCID number $ID_x$; and transmits data transmissions during its frequencies $F_x$ and time slots $T_x$ associated with that UE's BCID number $ID_x$ in the schedule at 528. For this example, since $f_n=3$, N=5 and M=120, 8 total slots are used for each IoT UE to transmit at least once. Thus 8 is the time periodicity $T_p$. For some embodiments, since the BS knows or can access the information used to calculate $T_p$ as noted above, the calculation above can be used to calculate $T_p$ at 426.

In our example, entry 730 of chart 700 includes N=5 transmissions at time $T_0$ and frequency $f_0$ for pairs of $ID_{0\text{-}4}$ using spreading codes $C_{0\text{-}4}$. This includes all of the data transmissions of column 630 of chart 600. Entries 740 and 750 include the next two N=5 transmissions at time $T_0$ at frequencies $f_1$ and $f_2$ respectively; and can use the same spreading codes $C_{0\text{-}4}$ due to multiplexing by frequencies $f_n$.

At entry 754 the first 120 IoT UE IDs are satisfied at the final N=5 transmission at frequency $f_0$ and time $T_7$ with the pair of $ID_{119}$ and spreading code $C_{39}$. At the next entry of chart 700 (not shown) since the first 120 IoT UE IDs have been satisfied by having had a time slot and spread code in the schedule in which to transmit data, the first N=1 transmission at frequency $f_0$ at time $T_8$ cycles to the pair of the next cycle of $ID_0$ and restarts using spreading code $C_0$.

Similar to chart 600, in some cases, if N does not divide evenly into M, the schedule could contain some empty pair locations, but those locations would number fewer than $N \times f_n$.

It is considered that other embodiments of the IoT uplink protocol described herein applying the mathematical operations noted in the example for FIG. 7 above to BSs or cells having different numbers for $f_n$, M, N, $T_p$, and/or $L_c$. Thus, FIG. 7 may provide one or more examples of calculating the schedule at 520 and sending data transmissions at 528.

By efficient schedule data transmissions from IoT UEs to a BS that serves those UEs in a "cell" of a cellular network, such as according to a IoT uplink protocol as described herein, embodiments of the present technology can provide many benefits. For example, embodiments of the present technology are able to efficient schedule data transmissions from IoT UEs to a BS that serves those UEs in a cell based on data analytics of collective information available at BS about the IoT UEs and coexisting LTE UEs such as their uplink data traffic pattern, priority, channel condition, availability of radio resources. This allows the technology (e.g., hardware and/or software updates) to be easily implemented at the BS and IoT UEs Another benefit of the embodiments of the present technology is that they avoid the requirement of explicit individual communication messages between the BS to UE before each uplink data transmission to the BS, thus minimizing control overhead at the BS. This also avoids crippling the communication ability of the BS that is serving hundreds or thousands of IoT UEs due to the time and messaging overhead to set up (e.g., handshake) for the small data messages these UEs uplink.

In addition, embodiments of the present technology provide a flexible and adaptive uplink schedule for uplinking data to a BS from IoT UEs that can be based on a density of IoT UEs, traffic demand, interference from LTE users, and bit error rate requirements of the cell. This can avoid an increase in data collisions, latency and retransmission for all the UEs of that cell or BS.

An additional benefit of embodiments of the present technology is the ability for the BS to adaptively manage the priority between LTE UE and IoT UE data traffic for IoT periodic updates, such as to allow for emergency traffic based on priority and/or service class of UEs. One example of this is the BS adjusting downward the periodicity of resources Tp being broadcast to the IoT UEs at 510 of FIG. 5A, so that the IoT UEs are deprioritized as compared to other LTE UEs which may be determined to have emergency or high priority traffic.

Figure 8:
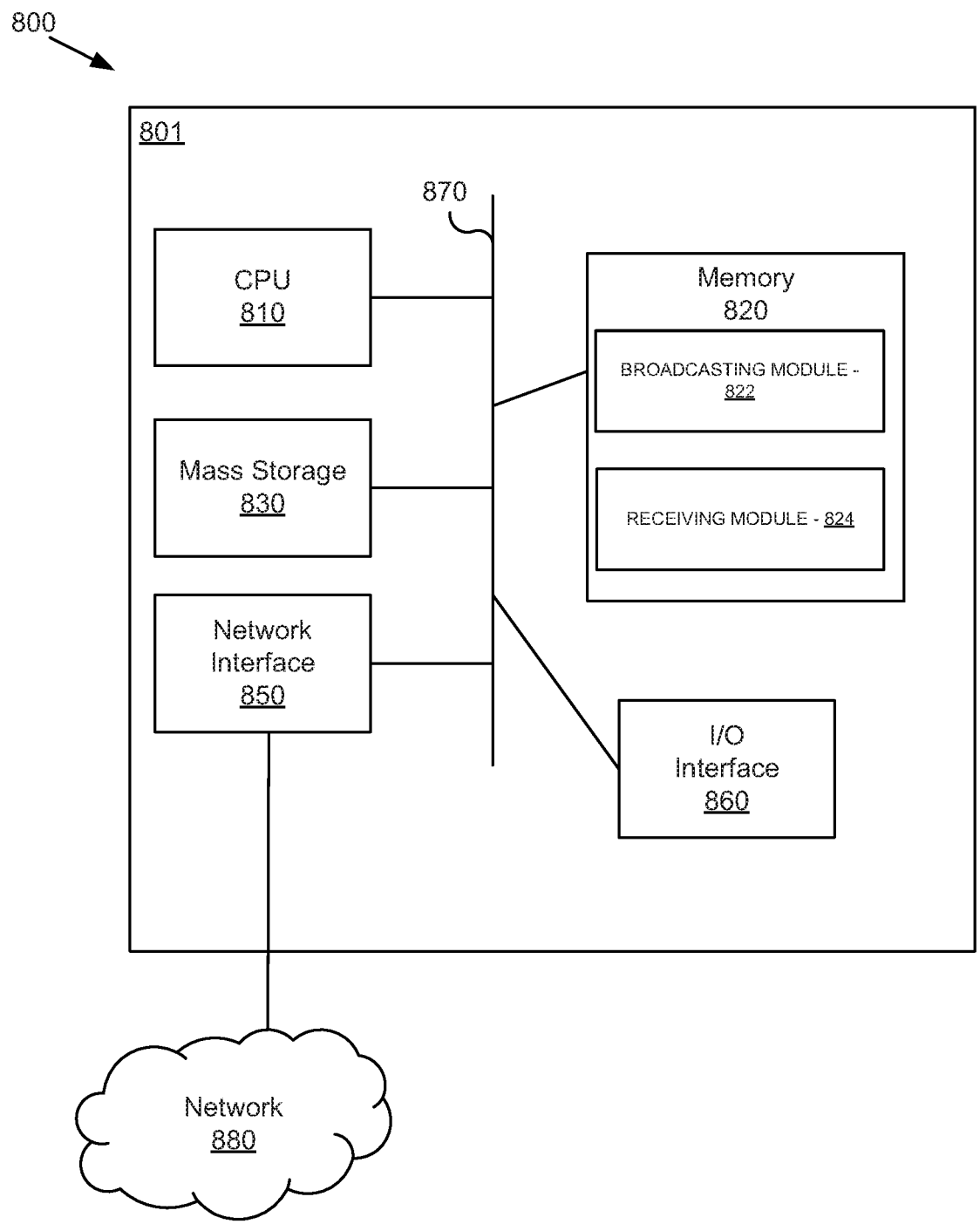
FIG. 8 is a block diagram of a network system that can be used to implement various embodiments.

FIG. 8 is a block diagram of a device 800 that can be used to implement various embodiments. In some cases, device 800 is or is included in BS 110. Specific devices may utilize all of the components shown, or a subset of the components, and levels of integration may vary from device to device. Furthermore, the device 800 may contain multiple instances of a component, such as multiple processing units, processors, memories, transmitters, receivers, etc. The device 800 may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus 870. The bus 870 may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory.

In some embodiments, the memory 820 includes a broadcasting module 822 for broadcasting synchronization information to IoT UEs of a cell, such as performed according to descriptions of FIGS. 1-7. The synchronization information may include a total number of the IoT UEs, a length of a spreading code, a time domain periodicity of available resources, a total number of the IoT UEs, and a maximum number of the IoT UEs that can simultaneously send data to the BS.

In some embodiments, the memory 820 includes a receiving module 824 for receiving data transmissions from each of the IoT UEs, such as performed according to descriptions of FIGS. 1-7. For some embodiments, the schedule is calculated independently at each of IoT UE by applying a mathematical operation to the received synchronization information.

The mass storage device 830 may comprise any type of storage device configured to store data, programs, and other information and to make the data, programs, and other information accessible via the bus 870. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880, which may be network 120 and/or a cellular network. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a cell, a cellular network, a local-area network or a wide-area network for data processing and communications with remote devices, such as other processing units, the Internet, remote storage facilities, LTE UEs, IoT UEs, cellular base stations, or the like.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Some embodiments herein may be implemented in computer-readable non-transitory media that includes all types of computer readable media, including magnetic storage media, optical storage media, and solid state storage media and specifically excludes signals. It should be understood that the software can be installed in and sold with the broadcasting module 822 and receiving module 824. Alternatively the software can be obtained and loaded into the broadcasting module 822 and receiving module 824, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

Finally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for scheduling data transmissions in a network, comprising:
    broadcasting synchronization information by a base station serving a plurality of user equipment in the network, wherein the synchronization information includes a total number of the plurality of user equipment, a length of a spreading code, a time domain periodicity of available resources, and a maximum number of the plurality of user equipment that data transmissions can be simultaneously received from; and
    receiving the data transmissions from each of the plurality of user equipment according to a schedule, the schedule including the spreading code and a time slot number associated with each of the plurality of user equipment's unique ID, wherein
    the schedule having been calculated at each of the plurality of user equipment prior to handshake between the plurality of user equipment and the base station, before an uplink transmission and by applying a mathematical operation to the synchronization information.

2. The method of claim 1, wherein the schedule includes an assignment of spreading codes for each of the plurality of user equipment to spread data for each of the data transmissions and an assignment of time slot numbers for each of the plurality of user equipment to use to send the data transmissions to the base station.

3. The method of claim 1, further comprising, prior to broadcasting the synchronization information:
    receiving an initialization signal from each of the plurality of user equipment;
    sending communication protocol information to each of the plurality of user equipment in response to receiving the initialization signals, wherein the communication protocol information includes frame timing information, frequency offsets and the unique ID for each of the plurality of user equipment; and
    receiving the data transmissions from each of the plurality of user equipment using a protocol that is based on the communication protocol information sent to each of the plurality of user equipment.

4. The method of claim 1, further comprising, prior to receiving each of the data transmissions from each of the plurality of user equipment:
    receiving power reference signals from each of the plurality of user equipment;
    sending power level information to each of the plurality of user equipment in response to receiving the power reference signals; and
    receiving the data transmissions from each of the plurality of user equipment at a power level that is based on the power level information sent to each of the plurality of user equipment.

5. The method of claim 1, further comprising:
    obtaining user equipment information and network information available to the base station, wherein the user equipment information and the network information include an uplink traffic demand from each of the plurality of user equipment, the total number of the plurality of user equipment, and an uplink traffic profile of each of the plurality of user equipment; and
    determining the synchronization information based on the obtained user equipment information and network information.

6. The method of claim 1,
    wherein:
    the plurality of user equipment are internet of thing (IoT) devices, and
    the schedule calculated at each of the plurality of user equipment is based on the spreading code to spread data for each of the received data transmissions and the time slot number in which to transmit each of the received data transmissions.

7. The method of claim 6, wherein:
the synchronization information further includes a multiplexing frequency used by the plurality of user equipment to schedule sending the data transmissions to the base station; and
the schedule is further based on an assignment of the multiplexing frequency for each of the plurality of user equipment to use to send the data transmissions to the base station.

8. A base station for scheduling data transmissions in a network, comprising:
a memory storage comprising instructions; and
one or more processors in communication with the memory storage, wherein the one or more processors execute the instructions to:
broadcast synchronization information to a plurality of user equipment in the network, wherein the synchronization information includes a total number of the plurality of user equipment, a length of a spreading code, a time domain periodicity of available resources, and a maximum number of the plurality of user equipment that data transmissions can be simultaneously received from; and
receive the data transmissions from each of the plurality of user equipment according to a schedule, the schedule including the spreading code and a time slot number associated with each of the plurality of user equipment's unique ID, wherein
the schedule having been calculated at each of the plurality of user equipment prior to handshake between the plurality of user equipment and the base station, before an uplink transmission and by applying a mathematical operation to the synchronization information.

9. The base station of claim 8, wherein the schedule includes an assignment of spreading codes for each of the plurality of user equipment to spread data for each of the data transmissions and an assignment of time slot numbers for each of the plurality of user equipment to use to send the data transmissions to the base station.

10. The base station of claim 8, wherein the one or more processors further execute the instructions to, prior to broadcasting the synchronization information:
receive an initialization signal from each of the plurality of user equipment;
send communication protocol information to each of the plurality of user equipment in response to receiving the initialization signals, wherein the communication protocol information includes frame timing information, frequency offsets and the unique ID for each of the plurality of user equipment; and
receive the data transmissions from each of the plurality of user equipment using a protocol that is based on the communication protocol information sent to each of the plurality of user equipment.

11. The base station of claim 8, wherein the one or more processors further execute the instructions to, prior to receiving each of the data transmissions from each of the plurality of user equipment:
receive power reference signals from each of the plurality of user equipment;
send power level information to each of the plurality of user equipment in response to receiving the power reference signals; and
receive the data transmissions from each of the plurality of user equipment at a power level that is based on the power level information sent to each of the plurality of user equipment.

12. The base station of claim 8, wherein the one or more processors further execute the instructions to:
obtain user equipment information and network information available to the base station, wherein the user equipment information and the network information include an uplink traffic demand from each of the plurality of user equipment, the total number of the plurality of user equipment, and an uplink traffic profile of each of the plurality of user equipment; and
determine the synchronization information based on the obtained user equipment information and network information.

13. The base station of claim 8, wherein
the plurality of user equipment is internet of thing (IoT) devices, and
the schedule is based on the spreading code to spread data for each of the received data transmissions and the time slot number in which to transmit each of the received data transmissions.

14. The base station of claim 13, wherein:
the synchronization information further includes a multiplexing frequency used by the plurality of user equipment to schedule sending the data transmissions to the base station; and
the schedule is further based on an assignment of the multiplexing frequency for each of the plurality of user equipment to use to send the data transmissions to the base station.

15. A non-transitory computer-readable medium storing computer instructions for scheduling data transmissions in a network, that when the computer instructions are executed by one or more processors, cause the one or more processors to perform the steps of:
broadcasting synchronization information, by a base station, to a plurality of user equipment in the network, wherein the synchronization information includes a total number of the plurality of user equipment, a length of a spreading code, a time domain periodicity of available resources, and a maximum number of the plurality of user equipment that data transmissions can be simultaneously received from; and
receiving the data transmissions from each of the plurality of user equipment according to a schedule, the schedule including the spreading code and a time slot number associated with each of the plurality of user equipment's unique ID, wherein
the schedule having been calculated at each of the plurality of user equipment prior to handshake between the plurality of user equipment and the base station, before an uplink transmission and by applying a mathematical operation to the synchronization information.

16. The non-transitory computer-readable medium of claim 15, wherein the schedule includes an assignment of spreading codes for each of the plurality of user equipment to spread data for each of the data transmissions and an assignment of time slot numbers for each of the plurality of user equipment to use to send the data transmissions to the base station.

17. The non-transitory computer-readable medium of claim 15, wherein the one or more processors further perform the steps of, prior to broadcasting the synchronization information:
receiving an initialization signal from each of the plurality of user equipment;
sending communication protocol information to each of the plurality of user equipment in response to receiving the initialization signals, wherein the communication protocol information includes frame timing information, frequency offsets and the unique ID for each of the plurality of user equipment; and receiving the data transmissions from each of the plurality of user equipment using a protocol that is based on the communication protocol information sent to each of the plurality of user equipment.

18. The non-transitory computer-readable medium of claim 15, wherein the one or more processors further perform the steps of, prior to receiving each of the data transmissions from each of the plurality of user equipment:

receiving power reference signals from each of the plurality of user equipment;

sending power level information to each of the plurality of user equipment in response to receiving the power reference signals; and receiving the data transmissions from each of the plurality of user equipment at a power level that is based on the power level information sent to each of the plurality of user equipment.

19. The non-transitory computer-readable medium of claim 15, wherein the one or more processors further perform the steps of:

obtaining user equipment information and network information available to the base station, wherein the user equipment information and the network information include an uplink traffic demand from each of the plurality of user equipment, the total number of the plurality of user equipment, and an uplink traffic profile of each of the plurality of user equipment; and determining the synchronization information based on the obtained user equipment information and network information.

20. The non-transitory computer-readable medium of claim 15, wherein the plurality of user equipment is internet of thing (IoT) devices, and the schedule is based on the spreading code to spread data for each of the received data transmissions and the time slot number in which to transmit each of the received data transmissions.

21. The non-transitory computer-readable medium of claim 20, wherein:

the synchronization information further includes a multiplexing frequency used by the plurality of user equipment to schedule sending the data transmissions to the base station; and the schedule is further based on an assignment of the multiplexing frequency for each of the plurality of user equipment to use to send the data transmissions to the base station.

* * * * *

UNITED STATES PATENT AND TRADEMARK OFFICE
CERTIFICATE OF CORRECTION

PATENT NO. : 10,764,907 B2
APPLICATION NO. : 15/859089
DATED : September 1, 2020
INVENTOR(S) : Ravindran et al.

It is certified that error appears in the above-identified patent and that said Letters Patent is hereby corrected as shown below:

On the Title Page

Item (54), and In the Specification, Column 1, Line 1, in the Title: please replace "TRANSMISSION" with --TRANSMISSIONS--

Signed and Sealed this
Twenty-fourth Day of May, 2022

*Katherine Kelly Vidal*

Katherine Kelly Vidal
*Director of the United States Patent and Trademark Office*